US012039822B2

(12) United States Patent
Shute et al.

(10) Patent No.: US 12,039,822 B2
(45) Date of Patent: Jul. 16, 2024

(54) STORAGE APPARATUS

(71) Applicant: Volumatic Limited, Coventry (GB)

(72) Inventors: Neil Alexander Shute, Coventry (GB); Duncan Johnson, Coventry (GB)

(73) Assignee: Volumatic Limited, Coventry (GB)

( * ) Notice: Subject to any disclaimer, the term of this patent is extended or adjusted under 35 U.S.C. 154(b) by 115 days.

(21) Appl. No.: 17/796,124

(22) PCT Filed: Feb. 15, 2021

(86) PCT No.: PCT/GB2021/050364
§ 371 (c)(1),
(2) Date: Jul. 28, 2022

(87) PCT Pub. No.: WO2021/161049
PCT Pub. Date: Aug. 19, 2021

(65) Prior Publication Data

US 2023/0343161 A1 Oct. 26, 2023

(30) Foreign Application Priority Data

Feb. 13, 2020 (GB) ..................................... 2001974
Jan. 28, 2021 (GB) ..................................... 2101222

(51) Int. Cl.
*G07D 11/125* (2019.01)
*G07D 11/14* (2019.01)

(52) U.S. Cl.
CPC ........... *G07D 11/125* (2019.01); *G07D 11/14* (2019.01)

(58) Field of Classification Search
CPC ....... G07D 11/125; G07D 11/14; G07D 11/12
See application file for complete search history.

(56) References Cited

U.S. PATENT DOCUMENTS 5,850,966 A * 12/1998 Siler .................... G07D 11/125 109/46
7,819,306 B2 * 10/2010 Williams ............. G07D 11/125 220/345.2

(Continued)

FOREIGN PATENT DOCUMENTS

CA 3208286 A1 * 8/2022 ............. G07D 11/00
EP 1503351 A2 2/2005

(Continued)

OTHER PUBLICATIONS

Combined Search and Examination Report for corresponding Great Britain Patent Application No. GB2001974.1 dated Apr. 29, 2020.

(Continued)

*Primary Examiner* — William L Miller
(74) *Attorney, Agent, or Firm* — Caesar Rivise, PC

(57) ABSTRACT

Apparatus for securely retaining documents, the apparatus (1) comprises a cover plate (4) and a receptacle (10), the receptacle (10) comprising a frame (3) and a pouch (2), the frame (3) comprising an opening (O) to access the pouch (2), the frame (3) further comprises at least one channel (31*a*, 31*b*) for receiving an edge (4*c*, 4*d*) of the cover plate (4) in use to cover the opening (O) of the frame (3) and to prevent access to the interior of the pouch (2) of the receptacle (10) when the cover plate (4) is in a closed position, wherein the frame (3) and the cover plate (4) each comprise engageable lock portions to prevent the cover plate (4) from being removed from the receptacle (10) when in the closed position, and wherein the frame (3) comprises a first formation (32*a*, 32*b*) located remotely from the at least one channel (31*a*, 31*b*) located between the at least one channel (31*a*, 31*b*) and the opening, the cover plate (4) comprises a second formation (42*a*, 42*b*) located remotely from the edge (4*c*, 4*d*) of the cover plate (4), the first formation (32*a*, 32*b*) and second formation (42*a*, 42*b*) are shaped to interlock to (Continued)

resist removal of the cover plate (4) in a direction transverse 15 and/or perpendicular to the major surface of the cover plate (4).

20 Claims, 9 Drawing Sheets

(56) References Cited

U.S. PATENT DOCUMENTS

| | | | | |
|---|---|---|---|---|
| 8,434,673 | B2 * | 5/2013 | Johnson | G07D 11/125<br>220/345.2 |
| 8,584,603 | B2 * | 11/2013 | Villiger | G07D 11/12<br>232/15 |
| 2003/0180131 | A1 * | 9/2003 | Lewis | G07D 11/14<br>414/411 |
| 2006/0071412 | A1 * | 4/2006 | Lewis | G07D 11/0093<br>232/15 |
| 2007/0145064 | A1 | 6/2007 | Clauser et al. | |
| 2008/0223915 | A1 * | 9/2008 | Williams | G07D 11/125<br>232/1 D |
| 2010/0193582 | A1 * | 8/2010 | Johnson | G07D 11/125<br>232/1 D |
| 2020/0202656 | A1 * | 6/2020 | Williams | G07D 11/125 |

FOREIGN PATENT DOCUMENTS

| | | | | | |
|---|---|---|---|---|---|
| EP | 1839281 | B1 | | 11/2010 | |
| GB | 2455558 | A | | 6/2009 | |
| GB | 2496533 | A | * | 5/2013 | E05G 1/14 |
| GB | 2592037 | A | | 8/2021 | |
| WO | WO2006/072781 | A1 | | 7/2006 | |

OTHER PUBLICATIONS

Combined Search and Examination Report for corresponding Great Britain Patent Application No. GB2101222.4 dated Jul. 15, 2022.

International Search Report for corresponding PCT Application No. PCT/GB2021/050364 dated May 10, 2021.

* cited by examiner

STORAGE APPARATUS

CROSS REFERENCE TO RELATED APPLICATIONS

This United States national phase application claims the benefit under 35 U.S.C. § 371 of PCT Application No. PCT/GB2021/050364, filed on Feb. 15, 2021, which in turn claims priority to British Application Serial No. GB 2001974.1 filed on Feb. 13, 2020 and to British Application Serial No. GB 2101222.4 filed on Jan. 28, 2021, and all of whose entire disclosures are incorporated by reference herein.

BACKGROUND OF THE INVENTION

This invention relates generally to an apparatus for the secure storage of valuable documents such as bank notes. More specifically, although not exclusively, this invention relates to an apparatus comprising a cover plate and a receptacle for the secure storage of valuable documents such as bank notes.

Typically, at a point of sale such as a cashier's desk in a supermarket, a container is suspended beneath the desk for the intermittent receipt of bank notes. The container may be used to store notes as they are taken from customers, and/or as an overflow for a till on or in the desk. For example, when the collected notes of a particular denomination in the till reaches a given level they may be transferred to the container, thereby offering enhanced security compared to keeping the store of notes in the till. Periodically, containers loaded with stored bank notes are taken by security personnel to a bank or other secure storage facility. More usually, however, containers loaded with stored bank notes are taken by staff to a central counting room, where the bank notes are counted and bagged for transport to the bank or other secure facility.

Some containers currently in use are rigid boxes which slide into and out of guides beneath a counter whereby they are supported. Provision is normally made for locking them in position. The front face of such a container is typically upwardly inclined and has an exposed top opening through which one or more notes can be inserted. Behind the inclined front face is a barrier with a central, vertical slot. A plunger mechanism, hinged near the bottom of the barrier, can be manipulated (when bank notes have been inserted) to push them through the slot into the cavity within the container. Containers of this kind have numerous drawbacks. They are expensive to produce and are not adequately tamper proof. Money behind the slotted barrier is still accessible through the opening and can be "fished out" using, for example, adhesive tape. Moreover, the relatively clumsy plunger mechanism can trap fingers and damage nails.

An advance in the storage of cash at point-of-sale terminals has been marketed and sold by the applicant under the trade mark Counter Cache Intelligent or CCI (both RTM). This device stores received documents (e.g. valuable documents such as bank notes and the like) in a receptacle. It is particularly desirable, and is known, to lock (e.g. irreversibly lock) a cover to the receptacle, such that the contents of the receptacle cannot be accessed during storage or transport of the apparatus. As used herein, the term "irreversibly lock" means that the cover either cannot be removed from the receptacle or that removal of the cover from the receptacle can only be effected through breaking or otherwise tamper evidently damaging a component of the apparatus.

EP1503351 comprises a receptacle for use in the CCi device. The receptacle is formed from a rigid frame spanned by a flexible pouch, the frame having parallel sides provided with channels which receive side edges of a cover in the form of a plate. The cover plate is slidable along the channels to close the frame and thereby prevent access to the contents of the receptacle. The leading edge of the cover forms an irreversible lock with the frame when fully inserted.

BRIEF SUMMARY OF THE INVENTION

It is a first non-exclusive object of the invention to provide an apparatus which forms a more secure engagement between the cover and the receptacle.

Accordingly, a first aspect of the invention provides an apparatus for securely retaining documents, the apparatus comprising a cover plate and a receptacle, the receptacle comprising a frame and a pouch, the frame comprising an opening to access the pouch, the frame further comprising at least one channel for (e.g. slidably) receiving an edge of the cover plate in use to cover the opening of the frame and to prevent access to the interior of the pouch of the receptacle when the cover plate is in a closed position, wherein the frame comprises a first formation located remotely from the at least one channel, the cover plate comprises a second formation located remotely from the edge of the cover plate, the first and second formation being shaped to interlock to resist (e.g. prevent) removal of the cover plate in a direction transverse and/or perpendicular to the major surface of the cover plate.

The first formation may be provided between the channel and the opening. The first formation may extend longitudinally along the frame.

Accordingly, a further aspect of the invention provides an apparatus for securely retaining documents, the apparatus comprising a cover plate and a receptacle, the receptacle comprising a frame and a pouch, the frame comprising an opening to access the pouch, the frame further comprising at least one channel for (e.g. slidably) receiving an edge of the cover plate in use to cover the opening of the frame and to prevent access to the interior of the pouch of the receptacle when the cover plate is in a closed position, said at least one channel comprising a base portion from which upstands a wall and an roof portion extending from the wall and overlying the base portion, the base portion further comprising one or more upstanding formations inboard of the wall.

Two or more upstanding formations may be provided. The first and second upstanding formations may be longitudinally displaced. The first and second upstanding formations may be laterally displaced with respect to one another such that the first upstanding formation may be closer to the wall of the channel than the second upstanding formation.

The frame may comprise two channels, each channel comprising a base from which upstands a wall and an roof portion extending from the wall and overlying the base, the base portion further comprising one or more upstanding formations inboard of the wall.

The at least one channel may extend substantially along the entire length of the frame, alternatively the at least one channel may extend along a major portion of the frame. The channel may comprise a roof portion. The or a roof portion may be continuous or discontinuous. If present the upstanding formations may not be overlain by a roof portion. The wall of the channel upstanding from the base may be continuous or discontinuous. If present the upstanding formations may lie adjacent the wall, or a portion of the wall, of the channel upstanding from the base.

The cover plate may comprise corresponding formations (e.g. depending formations) engageable with the upstanding formations. The cover plate may have the same number of depending formations as the frame has upstanding formations.

The depending formations and upstanding formations may be mutually engageable upon or during receipt of the edge of the cover plate within the channel of the frame. Preferably one or both of the depending formations and upstanding formations (for example each) are formed as serrations or ramps. Engagement of the cover plate with the frame may cause the depending formations and upstanding formations to engage, e.g. to cause one to move (e.g. slide) over the other. Continued engagement of the cover plate and frame may cause the depending formations and upstanding formations to ride over one another until they are free. Once the cover plate and frame are fully engaged the depending formations and upstanding formations may abut, thereby to provide a or a further lock against disengagement of the frame and cover plate.

The frame may also comprise a first formation located remotely from the at least one channel, the cover plate comprises a second formation located remotely from the edge of the cover plate, the first and second formation being shaped to interlock to resist (e.g. prevent) removal of the cover plate in a direction transverse and/or perpendicular to the major surface of the cover plate.

Advantageously, by having the interlock inboard of the peripheral edge of the cover plate and the channel provides the apparatus with a relatively stronger or more effective means to prevent removal of the cover plate from the frame. An attempt to remove the cover plate in a direction transverse and/or perpendicular to its major surface will result in the interlocking formations becoming more rigidly and inflexibly locked due to the angle that the force is applied. This effect is enhanced in comparison to locating the interlocking formations adjacent to or within a or the channel. In embodiments, a direction transverse to the or a major surface of the cover plate may be across (e.g. side to side). In embodiments, a direction transverse to the or a major surface of the cover plate may be vertical (e.g. toward and/or away from the major surface).

Further, the provision of the inboard interlock means that the edges of the cover plate and the channels can be configured to inhibit relative vertical motion therebetween, thereby providing a second securement.

Even more advantageously, an attempt to disengage the channel from the edge of the cover plate may be evident from visual inspection of the apparatus. This is because provision of the interlocked first and second formation means that application of a force of such magnitude is required that tamper-evident damage is inevitably caused to one or more component of an apparatus of the invention. Therefore, the first and second formations of the apparatus of the invention provide enhanced security by making it more difficult to remove the cover plate from the apparatus, and additionally by providing evidence of tampering.

In embodiments, the first formation and second formation may together comprise a male formation and a female formation. That is, the first formation may comprise a male formation or a female formation, and the second formation may comprise a male formation or female formation, complementary to the first formation.

In embodiments, the first formation may be elongate. The second formation may be elongate. The first formation and/or the second formation may extend in a longitudinal direction of the frame and/or cover plate. The first formation and the second formation together may comprise a protrusion (e.g. an elongate protrusion) and a recess (e.g. an elongate recess). The first and second formation may be one or more or an array of first formations and second formations.

The (e.g. elongate) protrusion may have a first portion upstanding (e.g. perpendicularly) from the major surface of the frame or the cover plate. In embodiments, the (e.g. elongate) protrusion may have a second portion located at the end of the first portion. The second portion may extend in a direction perpendicular to the first portion. The second portion may be or extend in parallel relations to the major surface of the frame or the cover plate.

The (e.g. elongate) protrusion may have an L-shaped or a T-shaped profile when viewed in side elevation. The (e.g. elongate) recess may be shaped to cooperate with the L-shaped or a T-shaped profile.

The (e.g. elongate) protrusion is located on the frame of the receptacle and the (e.g. elongate) recess is located on the cover plate. The (e.g. elongate) protrusion may be located on the cover plate and the (e.g. elongate) recess is located on the frame of the receptacle.

The first formation is slidably received within the second formation, in use. Advantageously, once the first formation of the frame is engaged with the second formation of the cover plate, removal may be effected only by slidably releasing the cover plate from the frame. The apparatus may be configured to prevent slidably removing the cover plate from the frame such that the cover plate is irreversibly locked to the frame. Any attempt to remove the cover plate from the frame in a direction that is transverse and/or perpendicular to the major surface of the cover plate is prevented by the at least one channel, and further enhanced by the interlocking formations according to the invention.

The first formation (e.g. an elongate protrusion) may be integrally formed with the frame of the receptacle. For example, the frame of the receptable may be formed from a plastics, e.g. a polymeric, material which is moulded. The first formation may be integrally moulded with the frame of the receptacle to provide evidence that the apparatus has been tampered with or otherwise compromised.

The second formation (e.g. a recess) may be integrally formed with the cover plate. For example, the cover plate may be formed from a plastics, e.g. a polymeric, material which is moulded. The second formation may be integrally moulded within the cover plate.

Advantageously, the provision of an integrally formed first formation and/or second formation provides relatively enhanced strength against attempts to remove the cover plate from the apparatus. Additionally, it is almost certain that any aggressive attempt to remove the cover plate will result in damage to the first formation and/or the second formation. For example, in embodiments wherein the first formation is a protrusion, the protrusion may become broken or snap from the frame of the receptacle.

In embodiments, at least a portion of the first formation and/or the second formation is in parallel relations to at least a portion of the at least one channel when in the closed position.

In embodiments, the first formation and/or the second formation is spaced from the at least one channel by a distance greater than the outer width of the at least one channel.

Advantageously, this type of spacing provides an interlocking first and second formation with enhanced strength towards attempts to remove the cover plate. The greater distance between the interlocking formations and the channel provides an apparatus wherein the cover plate is less easily flexed in a direction transverse and/or perpendicular to its major surface. This provides enhanced resistance towards any tampering attempt.

The frame may be rigid. The frame may be formed from a rigid material, for example, a plastics and/or a polymeric material. Advantageously, in these embodiments, the frame does not flex around the opening when objects are inserted into the receptacle, in use.

The opening of the frame may have flaps but preferably is absent flaps (i.e. it is 'flapless') that require opening to enable objects to be inserted into the receptacle, in use.

The thickness of the frame and/or the portion of the frame in between or adjoining the first formation to the channel, may be at least 0.7 mm thick. For example, the frame or a portion thereof (e.g. the portion between or adjoining the first formation to the channel) may be at least 0.7 mm, 0.8 mm, 0.9 mm, 1.0 mm, or 1.1 mm thick. In embodiments, the frame of a portion thereof may be between 0.7 and 1.1 mm thick, e.g. from any one of 0.7, 0.8, 0.9, 1.0 mm to any one of 1.1, 1.0, 0.9, 0.8 mm thick. In embodiments, the remainder of the frame excluding the portion between or adjoining the first formation to the channel may be approximately 0.7 mm thick, for example, between 0.5 to 0.9 mm thick, e.g. between any one of 0.5, 0.6, 0.7, 0.8 mm to any one of 0.9, 0.8, 0.7, 0.6 mm thick.

Advantageously, the portion of the frame between or adjoining the first formation to the channel may be reinforced by using a greater thickness of material in this area. This provides enhanced strength to the frame and cover plate, when in the closed position, to prevent attackers from accessing the receptacle by removing the cover plate. Moreover, the reinforced frame is less likely to flex, which means that the first formation is more likely to break and provide evidence of tampering during a sustained and determined attack.

In embodiments, the frame of the receptacle comprises a first end and a second end, and wherein the first formation (e.g. an elongate protrusion) extends (e.g. endlessly or without interruption) between the first end and the second end, for example at least partially from the first end to the second end of the frame, say, the majority or more of the way from the first end to the second end of the frame.

In embodiments, the cover plate comprises a leading end and a trailing end. In embodiments, the second formation (e.g. a recess) extends (e.g. endlessly or without interruption) from the leading end to the trailing end of the cover plate.

Advantageously, an interlocking formation which extends (e.g. endlessly or without interruption) between, for example from, the leading end to the trailing end of the apparatus provides an enhanced means to resist or prevent an attempt to remove the cover plate from the frame.

In embodiments, the frame may comprise or have a longitudinal or major direction. The first formation may extend (e.g. substantially) in the longitudinal or major direction of the frame.

In embodiments, the cover plate may comprise or have a longitudinal or major direction. The second formation may extend (e.g. substantially) in the longitudinal or major direction of the cover plate. The term 'longitudinal direction' may refer to a direction defined by the major dimension of the frame and/or cover plate.

In embodiments, the frame comprises a first end and a second end. The first formation (e.g. elongate protrusion) may extend across or along a portion of the frame between its first and second ends. For example, the first formation (e.g. elongate protrusion) may extend across or along ¾, ⅔, ½, ⅓, or ¼ of the frame between its first and second ends. In embodiments, the first formation (e.g. elongate protrusion) may extend across or along less than 90%, 80%, 70%, 60%, 50% or 40% of the length of the frame between its first and second ends. In embodiments, the first formation (e.g. elongate protrusion) may extend across or along the frame between 10% and 90% of the length of the frame between its first and second ends. In embodiments, the first formation (e.g. elongate protrusion) may extend across or along the frame between 15%, 20%, 25% or 30% and 35%, 40%, 45%, 50%, 55%, 60%, 65%, 70%, 75%, 80%, 85% or 90% of the length of the frame between its first and second ends.

The first formation (e.g. elongate protrusion) may extend across or along (or be positioned at or on) the or a central portion of the frame, for example a portion of the frame located or defined generally equidistant between the frame's first and second ends. The first formation (e.g. elongate protrusion) may be remote from (e.g. inboard of or spaced from) the first and/or second end of the frame. For example, the first formation (e.g. elongate protrusion) may extend across the central ¾, ⅔, ½, ⅓ or ¼ of the frame, for example between and remote (e.g. inboard of or spaced from) its first and second ends.

The frame may comprise a forming aperture therethrough. The forming aperture may be located beneath (e.g. substantially) or adjacent (e.g. substantially) the first formation. The forming aperture may be elongate. The forming aperture may extend across a portion of the frame between its first and/or second end, e.g. spaced from the first and/or second end of the frame. The forming aperture may be parallel to or with the first formation. The forming aperture may extend across or along the length of the frame, for example by a distance similar to the distance by which the first formation extends. In embodiments, the forming aperture may extend across or along the length of the frame by a distance less than the distance by which the first formation extends. In embodiments, the forming aperture may extend across or along the length of the frame by a distance less than the distance by which the first formation extends.

In embodiments, the cover plate may comprise a leading end and a trailing end, and the second formation (e.g. recess) may extend across or along a portion of the cover plate between its leading and trailing ends. For example, the second formation (e.g. recess) may extend across or along ¾, ⅔, ½, ⅓ or ¼ of the cover plate between its leading and trailing ends. In embodiments, the second formation (e.g. recess) may extend across or along less than 90%, 80%, 70%, 60%, 50% or 40% of the length of the cover plate between its leading and trailing ends. In embodiments, the second formation (e.g. recess) may extend across or along the cover plate between 10% and 90% of the length of the cover plate between its leading and trailing ends. In embodiments, the second formation (e.g. recess) may extend across or along the cover plate between 15%, 20%, 25% or 30% and 35%, 40%, 45%, 50%, 55%, 60%, 65%, 70%, 75%, 80%, 85% or 90% of the length of the cover plate between its leading and trailing ends.

The second formation (e.g. recess) may extend across or along (or be positioned at or on) the or a central portion of the cover plate, for example a portion of the cover plate located or defined generally equidistant between the cover plate's leading and trailing ends. The second formation (e.g. recess) may be remote from (e.g. inboard of or spaced from) the leading and/or trailing ends of the cover plate. For example, the second formation (e.g. recess) may extend across the central ¾, ⅔, ½, ⅓ or ¼ of the cover plate, for example between and remote (e.g. inboard of or spaced from) its leading and trailing ends.

At least a portion of the or a first formation may be configured to interlock with at least a portion of the or a second formation. The first formation may comprise a portion configured to engage or interlock with at least a portion of the or a second formation. In embodiments, all (e.g. substantially) of the first formation may be configured to engage or interlock with the or at least a portion of the second formation. The first formation may comprise a projection (e.g. an elongate projection), for example which may extend parallel (e.g. substantially) to the or a major surface of the frame. The first formation may comprise a wall (e.g. an elongate wall). The projection (e.g. elongate projection) may extend from the wall (e.g. elongate wall). At least a portion of the first formation may comprise an L-shaped cross-section.

The second formation may comprise a portion configured to engage or interlock with at least a portion of the or a first formation. In embodiments, all (e.g. substantially) of the second formation may be configured to engage or interlock with the or at least a portion of the first formation. The second formation may comprise a recess (e.g. an elongate recess). The second formation may comprise a projection (e.g. an elongate projection). The projection (e.g. elongate projection) may extend at least partially above or over the recess (e.g. elongate recess). At least a portion of the second formation may comprise an L-shaped cross section.

In embodiments, the frame may comprise a first end and a second end, and the first formation may comprise an L-shaped portion. The L-shaped portion (e.g. the portion of the first formation configured to interlock with at least a portion of the second formation) may extend across or along a portion of the frame between its first and second ends. For example, the L-shaped portion of the first formation (e.g. the portion of the first formation configured to interlock with at least a portion of the second formation) may extend across or along ¾, ⅔, ½, ⅓ or ¼ of the frame between its first and second ends. In embodiments, the L-shaped portion of the first formation (e.g. the portion of the first formation configured to interlock with at least a portion of the second formation) may extend across or along less than 90%, 80%, 70%, 60%, 50% or 40% of the length of the frame between its first and second ends. In embodiments, the L-shaped portion of the first formation (e.g. the portion of the first formation configured to interlock with at least a portion of the second formation) may extend across or along the frame between 10% and 90% of the length of the frame between its first and second ends. In embodiments, the L-shaped portion of the first formation (e.g. the portion of the first formation configured to interlock with at least a portion of the second formation) may extend across or along the frame between 15%, 20%, 25% or 30% and 35%, 40%, 45%, 50%, 55%, 60%, 65%, 70%, 75%, 80%, 85% or 90% of the length of the frame between its first and second ends.

The L-shaped portion of the first formation (e.g. the portion of the first formation configured to interlock with at least a portion of the second formation) may extend across or along (or be positioned at or on) the or a central portion of the frame, for example a portion of the frame located or defined generally equidistant between the frame's first and second ends. The L-shaped portion of the first formation (e.g. the portion of the first formation configured to interlock with at least a portion of the second formation) may be remote from (e.g. inboard of or spaced from) the first and/or second end of the frame. For example, the L-shaped portion of the first formation (e.g. the portion of the first formation configured to interlock with at least a portion of the second formation) may extend across the central ¾, ⅔, ½, ⅓ or ¼ of the frame, for example between and remote (e.g. inboard of or spaced from) its first and second ends.

The frame may comprise a forming aperture therethrough. The forming aperture may be located beneath (e.g. substantially) or adjacent (e.g. substantially) the L-shaped portion of the first formation (e.g. the portion of the first formation configured to interlock with at least a portion of the second formation). The forming aperture may be elongate. The forming aperture may extend across a portion of the frame between its first and/or second end, e.g. spaced from the first and/or second end of the frame. The forming aperture may be parallel to or with at least a portion of the first formation. The forming aperture may extend across or along the length of the frame, for example by a distance similar to the distance by which the L-shaped portion of the first formation (e.g. the portion of the first formation configured to interlock with at least a portion of the second formation) extends. In embodiments, the forming aperture may extend across or along the length of the frame by a distance less than the distance by which the L-shaped portion of the first formation (e.g. the portion of the first formation configured to interlock with at least a portion of the second formation) extends. In embodiments, the forming aperture may extend across or along the length of the frame by a distance less than or greater than the distance by which the L-shaped portion of the first formation (e.g. the portion of the first formation configured to interlock with at least a portion of the second formation) extends.

In embodiments, the cover plate may comprise a leading end and a trailing end, and the second formation may comprise an L-shaped portion. The L-shaped portion (e.g. the portion of the second formation configured to interlock with at least a portion of the first formation) may extend across or along a portion of the cover plate between its leading and trailing ends. For example, the L-shaped portion of the second formation (e.g. the portion of the second formation configured to interlock with at least a portion of the first formation) may extend across or along ¾, ⅔, ½, ⅓ or ¼ of the cover plate between its leading and trailing ends. In embodiments, the L-shaped portion of the second formation (e.g. the portion of the second formation configured to interlock with at least a portion of the first formation) may extend across or along less than 90%, 80%, 70%, 60%, 50% or 40% of the length of the cover plate between its leading and trailing ends. In embodiments, the L-shaped portion of the second formation (e.g. the portion of the second formation configured to interlock with at least a portion of the first formation) may extend across or along the cover plate between 10% and 90% of the length of the cover plate between its leading and trailing ends. In embodiments, the L-shaped portion of the second formation (e.g. the portion of the second formation configured to interlock with at least a portion of the first formation) may extend across or along the cover plate between 15%, 20%, 25% or 30% and 35%, 40%, 45%, 50%, 55%, 60%, 65%, 70%, 75%, 80%, 85% or 90% of the length of the cover plate between its leading and trailing ends.

The L-shaped portion of the second formation (e.g. the portion of the second formation configured to interlock with at least a portion of the first formation) may extend across or along (or be positioned at or on) the or a central portion of the cover plate, for example a portion of the cover plate located or defined generally equidistant between the cover plate's leading and trailing ends. The L-shaped portion of the second formation (e.g. the portion of the second formation configured to interlock with at least a portion of the first formation) may be remote from (e.g. inboard of or spaced from) the leading and/or trailing ends of the cover plate. For example, L-shaped portion of the second formation (e.g. the portion of the second formation configured to interlock with at least a portion of the first formation) may extend across the central ¾, ⅔, ½, ⅓ or ¼ of the cover plate, for example between and remote (e.g. inboard of or spaced from) its leading and trailing ends.

Advantageously, interlocking first and second formations which extend across the central portion of the apparatus provide an enhanced means to resist or prevent an attempt to separate the cover plate from the frame. More specifically, the interlocking first and second formations provide an enhanced means for resisting or preventing an attempt to separate the cover plate from the frame (when engaged therewith) in a direction transverse and/or perpendicular to a plane parallel to a major surface of the cover plate or frame.

In embodiments, the first formation and/or the second formation may be located in between the opening and the at least one channel of the frame. In embodiments, the first formation may be located towards the centre of the frame of the receptacle. In embodiments, the second formation may be located towards the centre of the cover plate.

In embodiments, the frame comprises a first channel and a second channel. In embodiments, one or both of the first and second channel is located at the periphery or side edge of the frame. The first and second channels receive respective peripheral portions of the cover plate.

The or each channel may be formed from a first wall, an upstanding wall (e.g. an upstanding peripheral wall), which upstanding wall preferably extends at right angles to the first wall, a second wall extending from the upstanding wall, (e.g. upstanding peripheral wall), at least a portion of the second wall preferably overlying at least a portion of the first wall (e.g. may extend in parallel relations to the first wall). The second wall may have a free edge. A return wall may extend from the free edge, for example, at least a portion of the return wall may extend over at least a portion of the upstanding wall. In an embodiment the return wall may extend in parallel relations to the upstanding wall. Preferably the return wall is of smaller dimensions than the upstanding wall so as to provide an aperture, e.g. an elongate aperture through which, in use, a portion of the cover plate may extend.

The cover plate may comprise a first elongate edge portion and/or a second elongate edge portion, e.g. for receipt in a respective channel of the frame. The first elongate edge portion may comprise a base and a first upstanding body or wall and/or the first elongate edge portion may comprise a first inboard body or wall. The first upstanding body or wall may be located at the periphery of the first elongate edge portion. The second elongate edge portion may comprise a base and a second upstanding body or wall and/or the second elongate edge portion may comprise a second inboard body or wall. The second upstanding body or wall may be located at the periphery of the second elongate edge portion. The first and/or second upstanding body of wall and/or the first and/or second inboard body or wall may be locatable or located in the at least on channel, e.g. in a respective channel.

In an embodiment the first upstanding body or wall and the first inboard body or wall are joined by a connecting portion. In an embodiment the first upstanding body or wall and the first inboard body or wall are separate. In an embodiment the second upstanding body or wall and the second inboard body or wall are joined by a connecting portion. In an embodiment the second upstanding body or wall and the second inboard body or wall are separate.

In embodiments, the frame comprises a further first formation located remotely from the at least one channel, the cover plate comprises a further second formation located remotely from the at least one channel of the frame when the cover plate is in the closed position, the further first and second formation are shaped to interlock and are configured in use to resist (e.g. prevent) removal of the cover plate in a direction transverse and/or perpendicular to the major surface of the cover plate.

In embodiments, the first formation of the frame is located in between the opening and the first channel of the frame, and the further first formation is located in between the opening and the second channel of the frame.

In embodiments, the apparatus comprises a lock or locking means configured in use to irreversibly lock the cover plate into a closed position on the receptable.

Advantageously, a lock or locking means (e.g. an irreversible lock or irreversibly locking means) prevents the cover plate from being removed in a slidable manner. The lock or locking means may also further prevent the cover plate from being removed in a direction transverse and/or perpendicular to its major surface by providing an additional mechanism to fasten the cover plate to the frame.

In embodiments, the lock or locking means comprises an interlocking tongue and groove or male and female member.

In embodiments, the interlocking tongue or male member is located on or formed with the cover and/or the groove or female member is located on or formed with the frame of the receptacle. The interlocking tongue may be located on or formed with the leading end (where provided) of the cover. The groove or female member may be located on or formed with the first end (where provided) of the frame. The first and second formations of the interlocking formations (where provided) may be spaced from the interlocking tongue (or male member) and/or the groove or female member (e.g. spaced from the lock or locking means).

The apparatus may comprise a further locking means or mechanism. For example, the further locking means or mechanism may comprise one or more locking formation on the frame and one or more corresponding lock formation on the cover plate.

The or each locking formation may be located inboard of the first and/or second ends (where provided) of the frame. The or each lock formation may be located inboard of the leading and/or trailing ends (where provided) of the cover plate.

The or each locking formation and corresponding lock formation may together comprise complementary male and female formations. The or each locking formation and corresponding lock formation may together comprise a protrusion or protrusions and a recess or recesses. The or each lock formation and locking formation may together comprise one or more interlocking clip or catch, e.g. ramp clip or ramp catch. The, one, some or each locking formation may comprise a ramp surface. The, one, some or each locking formation may comprise an abutment surface. The, one, some or each lock formation may comprise a ramp surface. The, one, some or each lock formation may comprise an abutment surface. The ramp surface of the, one some or each locking formation may be configured (e.g. shaped, sized, positioned and/or oriented) to allow the corresponding lock formation to slide thereover when the cover plate is slid into the frame (or otherwise engaged therewith or therein). The abutment surface of the, one, some or each locking formation may be configured (e.g. shaped, sized, positioned and/or oriented) to restrict or prevent movement of the corresponding lock formation therepast after the cover plate has been slid into the frame (or otherwise engaged therewith or therein). The ramp surface of the, one some or each lock formation may be configured (e.g. shaped, sized, positioned and/or oriented) to allow the corresponding locking formation to slide thereover when the cover plate is slid into the frame (or otherwise engaged therewith or therein). The abutment surface of the, one, some or each lock formation may be configured (e.g. shaped, sized, positioned and/or oriented) to restrict or prevent movement of the corresponding locking formation therepast after the cover plate has been slid into the frame (or otherwise engaged therewith or therein).

Advantageously, the further locking means or mechanism may further prevent or resist the cover plate from being removed in a direction transverse and/or perpendicular to its major surface by providing an additional mechanism to fasten the cover plate to the frame. In embodiments, the further locking means or mechanism may be configured or arranged to resist disengagement (e.g. sliding disengagement, say in a direction between the first and second end of the frame, where provided) of the cover plate from the frame after the cover plate has been engaged with or in the frame. For example, the, one, some or each locking formation and/or the, one, some or each lock formation may be configured or arranged (e.g. sized, shaped, positioned and/or oriented) to resist disengagement (e.g. sliding disengagement, say in a direction between the first and second end of the frame, where provided) of the cover plate from the frame after the cover plate has been engaged with or in the frame.

Where the further locking means or mechanism comprises one or more locking formation on the frame, the, one, some or each locking formation may be located within the or one of the at least one channel. In some embodiments, the one or more locking formation may be provided or located on the or a major surface of the frame, for example extending therefrom, thereinto or therethrough. In embodiments, the further locking means or mechanism comprises plural locking formations on the frame. Where the frame comprises a first channel and a second channel, one or more locking formation may be located within the first channel and/or one or more locking formation may be located within the second channel.

Where the further locking means or mechanism comprises one or more lock formation on the cover plate, the, one, some or each lock formation may be located for receipt, in use, in a respective channel of the frame. For example, the, one, some or each lock formation by be located at or adjacent a peripheral edge of the cover plate. In embodiments, some lock formations may be located at or adjacent each peripheral edge of the cover plate. In embodiments, the cover plate may comprise means for engaging the or each channel of the frame. The, one, some or each lock formation may be located within the means for engaging the or each channel of the frame. For example, the means for engaging the or each channel of the frame may comprise one or each peripheral edge of the cover plate comprising one or more, e.g. a plurality of, upstands. In embodiments, where there are plural upstands at one or each peripheral edge of the cover plate the, one, some or each lock formation may be located between a first and second upstand, e.g. between an outboard and intermediate upstand. The one, some or each lock formation may be located adjacent one of the plurality of upstands.

In some embodiments, the one or more lock formation may be provided or located on the or a major surface of the cover plate, for example extending therefrom, thereinto or therethrough. In embodiments, the further locking means or mechanism comprises plural lock formations on the cover plate. Where the frame comprises a first channel and a second channel, one or more lock formation may be located on the cover plate so as to be positioned, in use, within the first channel and/or one or more lock formation may be located on the cover plate so as to be positioned, in use, within the second channel.

Where plural locking formations are located in a single channel of the frame, one or more or each locking formation may be offset (e.g. in a direction extending between the first and second end of the frame, where the frame has first and second ends) from the others or from each other locking formation. For example, a first locking formation may be located towards an inboard edge of the channel and a second locking formation may be located towards an outboard edge of the channel. For example, a first locking formation in the channel may be located relatively closer to an inboard edge of the channel than a second locking formation in the channel. Where plural lock formations are located on the cover plate they may be arranged or positioned to correspond to the location of the locking formations on the frame, e.g. when the cover plate and frame are engaged together in use.

In this way, when the cover plate is slidably received and engaged by the frame, the first locking formation on the frame may only engage with a corresponding first lock formation on the cover plate. Accordingly, the cover plate may be received by the frame (e.g. slid thereinto) until the leading end of the cover plate (where provided) is adjacent the first end of the frame (where provided). In this way, the cover plate may be removed from the frame (e.g. slid therefrom) at any time until the leading end of the cover plate (where provided) is adjacent the first end of the frame (where provided).

Sliding of the cover plate into the frame may cause each locking formation on the frame to simultaneously engage with each corresponding lock formation on the cover plate (where plural locking and lock formations are provided).

Where the apparatus comprises a further locking means or mechanism, the apparatus, in particular the frame, may comprise one or more structural apertures. For example, one or more structural apertures may be provided in one or more walls of the or each channel of the frame. For example, one or more structural apertures may be provided in the one or more side walls of the frame and/or channel and/or in one or more joining walls which join the or each side wall of the channel. Preferably, the or each structural aperture is provided adjacent a locking means or mechanism.

Advantageously, provision of a structural aperture adjacent a locking means or mechanism enables the frame to be manufactured at relatively reduced expense. For example, provision of the structural apertures may allow the frame to be manufactured as one piece (e.g. in a single, integral piece), for example via moulding. Absent the structural apertures it may not be possible to form the frame in one piece. By forming the frame in one piece the costs of manufacture may be relatively reduced (with subsequent reduction in overall expense of the apparatus).

Accordingly, a further aspect of the invention may provide moulding a cover plate for a receptacle, the method comprising locating plastics material in a mould to form a cover plate comprising an elongate body with side portions and end portions and a plate body extending between the side portions and end portions, the plate body comprising at least one formation upstanding therefrom, the formation comprising a first upstanding wall and a second wall extending from the end of the upstanding wall in non parallel relations so as to extend over the plate body, the plate body further comprising an aperture located below the second wall.

A yet further aspect of the invention provides a method of moulding a receptacle for receiving a cover plate, the method comprising locating plastics material in a mould to form a receptacle comprising a frame, the frame comprising a side channel for receiving an edge of a cover plate and an opening inboard of the side channel and a recess or rebate for receiving a formation on the cover plate, the recess or rebate comprising a hood portion which overlies a base portion; the method further comprising removing the frame from the mould and securing a pouch to the frame to form the receptacle.

The frame and/or cover plate may comprise lock means at one end thereof. The lock means may be moulded in the same moulding step.

Within the scope of this application it is expressly envisaged that the various aspects, embodiments, examples and alternatives set out in the preceding paragraphs, in the claims and/or in the following description and drawings and, in particular, the individual features thereof, may be taken independently or in any combination. Features described in connection with one aspect or embodiment of the invention are applicable to all aspects or embodiments, unless such features are incompatible.

BRIEF DESCRIPTION OF SEVERAL VIEWS OF THE DRAWINGS

Embodiments of the invention will now be described by way of example only with reference to the accompanying drawings in which.

DETAILED DESCRIPTION OF THE PREFERRED EMBODIMENTS

Figure 15:
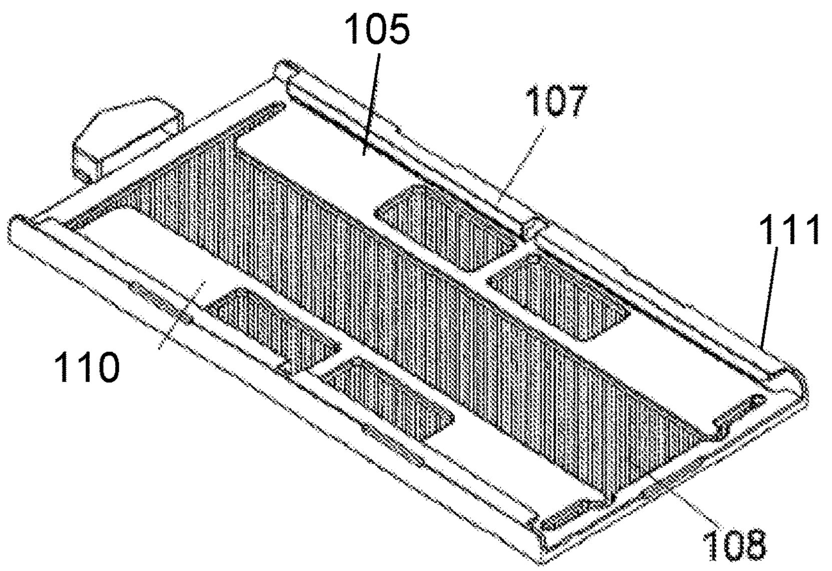
Figure 15 (Prior Art)
FIG. 15 is an isometric view of a prior art receptacle.

Referring first to FIG. 15, there is shown a receptacle 105 as disclosed in EP1503351. The receptacle 105 comprises a frame 107 which is provided with a flexible bag 108 for receipt of documents. The receptacle 105 is provided with a pair of flaps 110, between which is a gap through which notes are inserted, in use, for example using a plunger mechanism. The receptacle 105 is closed by a cover plate (not shown) which is slidable received in peripheral channels 111. The channels 111 are substantially Π-shaped, each having substantially parallel innermost and outermost walls, joined by a joining wall. The innermost wall of each channel 111 has a free end to allow the cover plate to be received in the channels 111.

Figure 1:
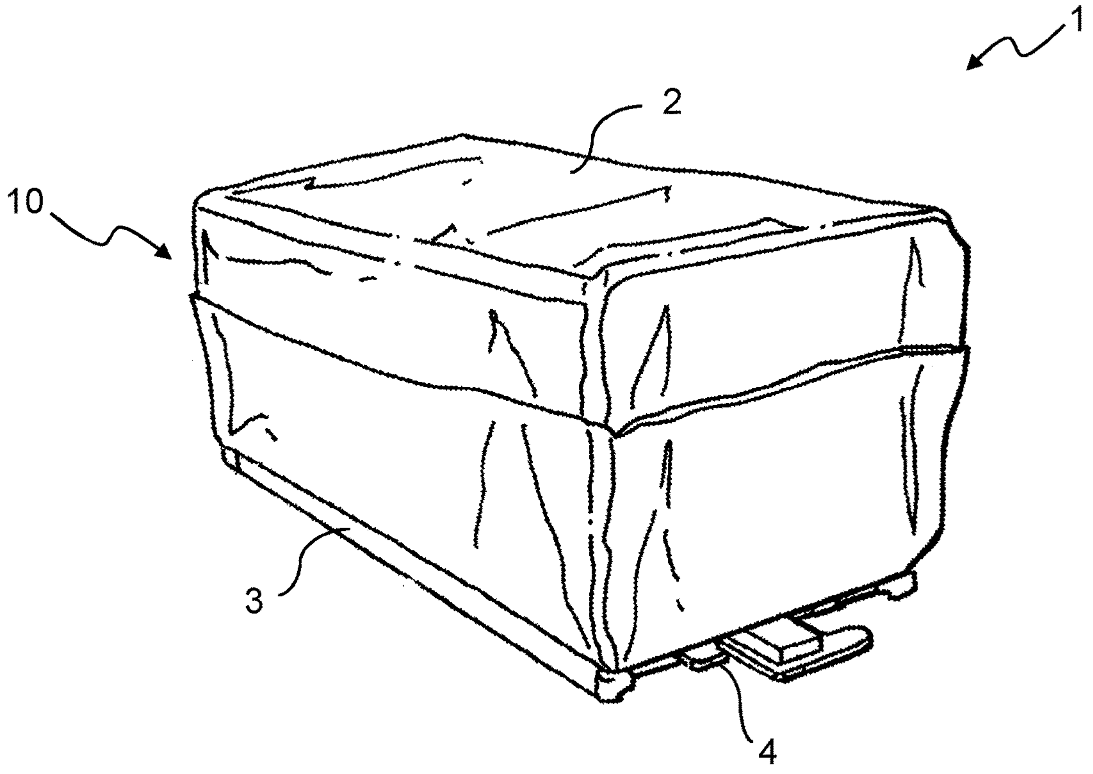
FIG. 1 is a perspective view of an apparatus for securely retaining bank notes according to the invention, the apparatus comprising a cover plate and a frame, and shown in a closed condition.

Referring now to FIG. 1, there is shown an apparatus 1 for securely retaining documents such as bank notes according to an embodiment of the invention. The apparatus 1 comprises a receptacle 10 having a pouch or bag 2 and a frame 3 closed by a cover plate 4.

The pouch 2 may be formed from an at least partially flexible material, such as a plastics material (e.g. polypropylene or other suitable polymer film). The pouch 2 and the frame 3 may be formed from the same plastics material, so that (advantageously) recycling of the receptacle 10 is more readily achieved (e.g. without having to first separate the pouch 2 from the frame 3). The frame 3 and the cover plate 4 may be formed from the same materials. Alternatively, the pouch 2 and frame 3 may be formed from different materials.

Figure 2:
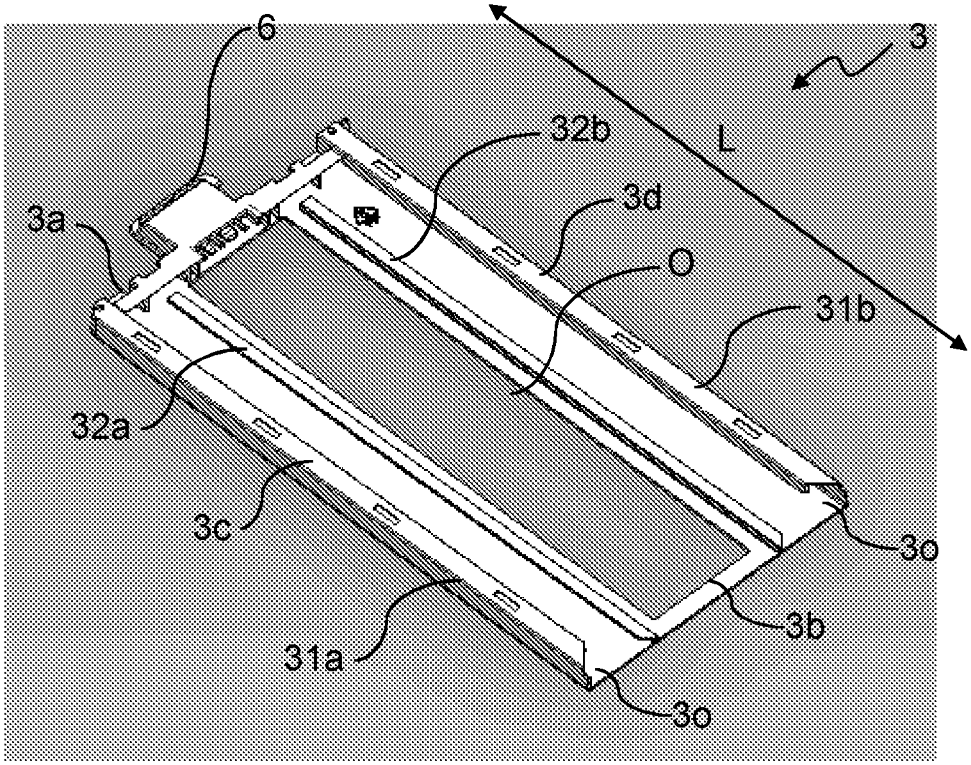
FIG. 2 is a perspective view of the frame of the apparatus shown in FIG. 1.
Figure 3:
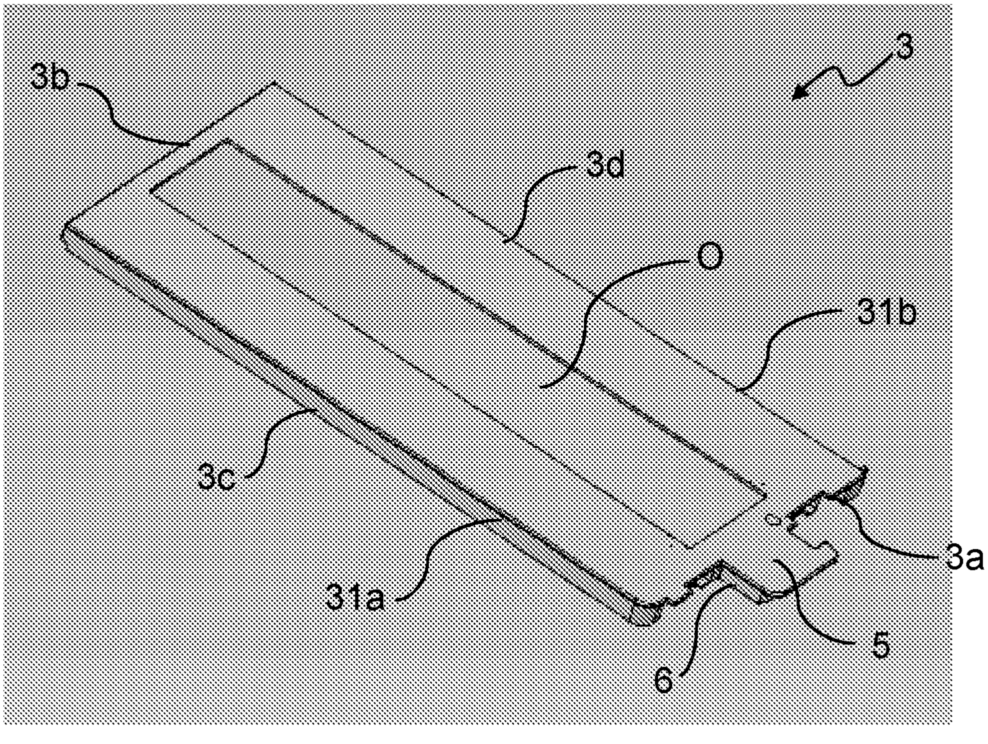
FIG. 3 is a reverse perspective view of the frame shown in FIG. 2.

Referring also to FIGS. 2 and 3, there is shown a frame 3 of the apparatus 1. The frame 3 comprises a first end **3*a* and a second end 3*b* interconnected by a pair of opposed sides 3*c*, 3*d*. The sides 3*c*, 3*d* each comprise a slot or channel 31*a*, 31*b* for receipt of side edges of the cover plate 4. The channels 31*a*, 31*b* may be of the same Π-shaped form as those shown in EP1503351, each having substantially parallel innermost and outermost walls 3*k* and 3*m* respectively, joined by a joining wall 31 (see FIG. 10A). The innermost wall 3*k* of each channel 31*a*, *b* has a free end 3*o* to allow the cover plate 4 to be received in the channels 31*a*, *b***.

The first end **3*a* of the frame comprises a lock cover 5 and a lock base 6. The lock cover 5 is located over the lock base 6 and is attached to the frame 3. The lock base 6 is integrally formed with the first end 3*a* of the frame 3. The frame comprises a longitudinal direction L, which extends in the major dimension of the frame 3** in this embodiment.

The frame 3 further comprises a pair of elongate formations **32*a*, 32*b*. The elongate formations 32*a*, 32*b* extend in the longitudinal direction L of the frame 3. In this embodiment, each of the formations 32*a*, 32*b* is an elongate protrusion having an L-shaped profile when viewed in side elevation with the free end of each protrusion facing towards a respective channel 31**.

The formation **32*a* is located remotely from the channel 31*a* on the frame 3. Similarly, the formation 32*b* is located remotely from the channel 31*b* on the frame 3. That is, the formation 32*a* is spaced from the channel 31*a*, is independent from the channel 31***a*, and does not interact with the mechanism of the channel 31*a* in any way. In this embodiment, each formation 32*a*, 32*b* is located in between the channel 31*a*, 31*b* and an opening O of the frame 3, in parallel relations to each channel 31*a*, 31*b*. The formations 32*a*, 32*b* extend endlessly and without interruption from the first end 3*a* of the frame 3 to the second end 3*b* of the frame 3.

The opening O is surrounded by the first end 3*a*, second end 3*b* and sides 3*c*, 3*d*. The opening O is configured (e.g. sized and shaped) to allow the insertion of bank notes therethrough, in use of the apparatus 1.

Figure 6:
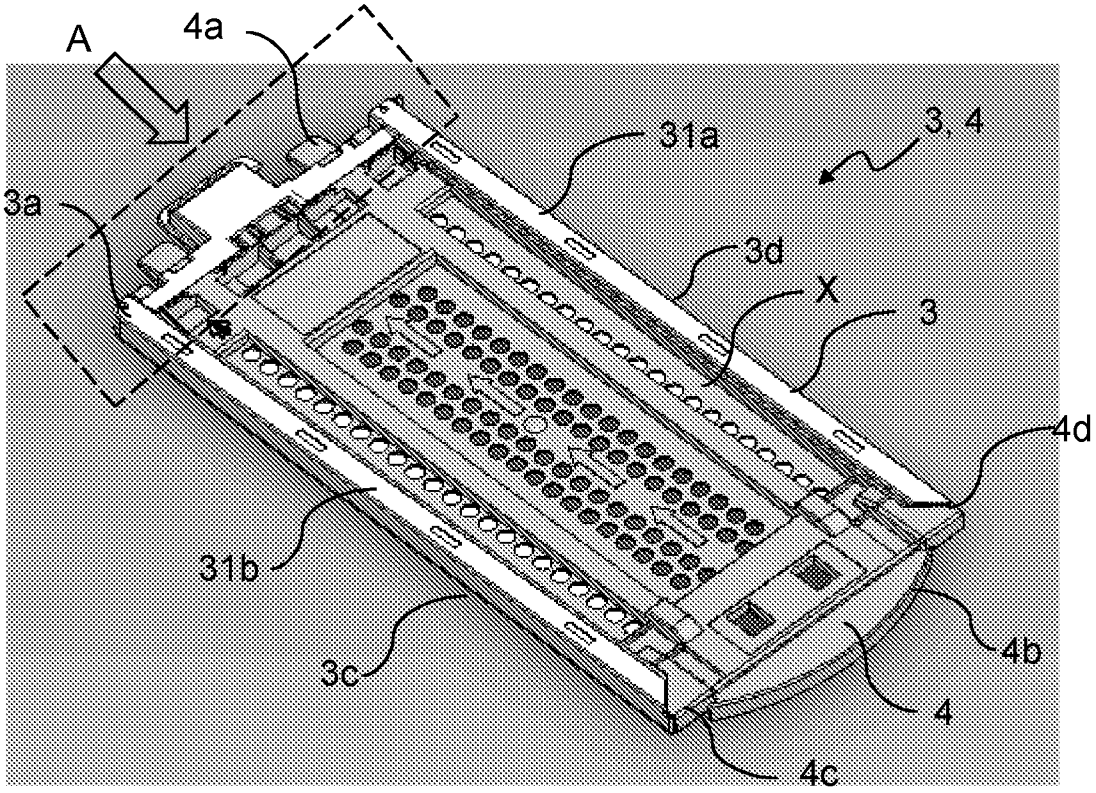
FIG. 6 is a perspective view of the apparatus of FIG. 1 in a closed condition, absent the flexible pouch.
Figure 7:
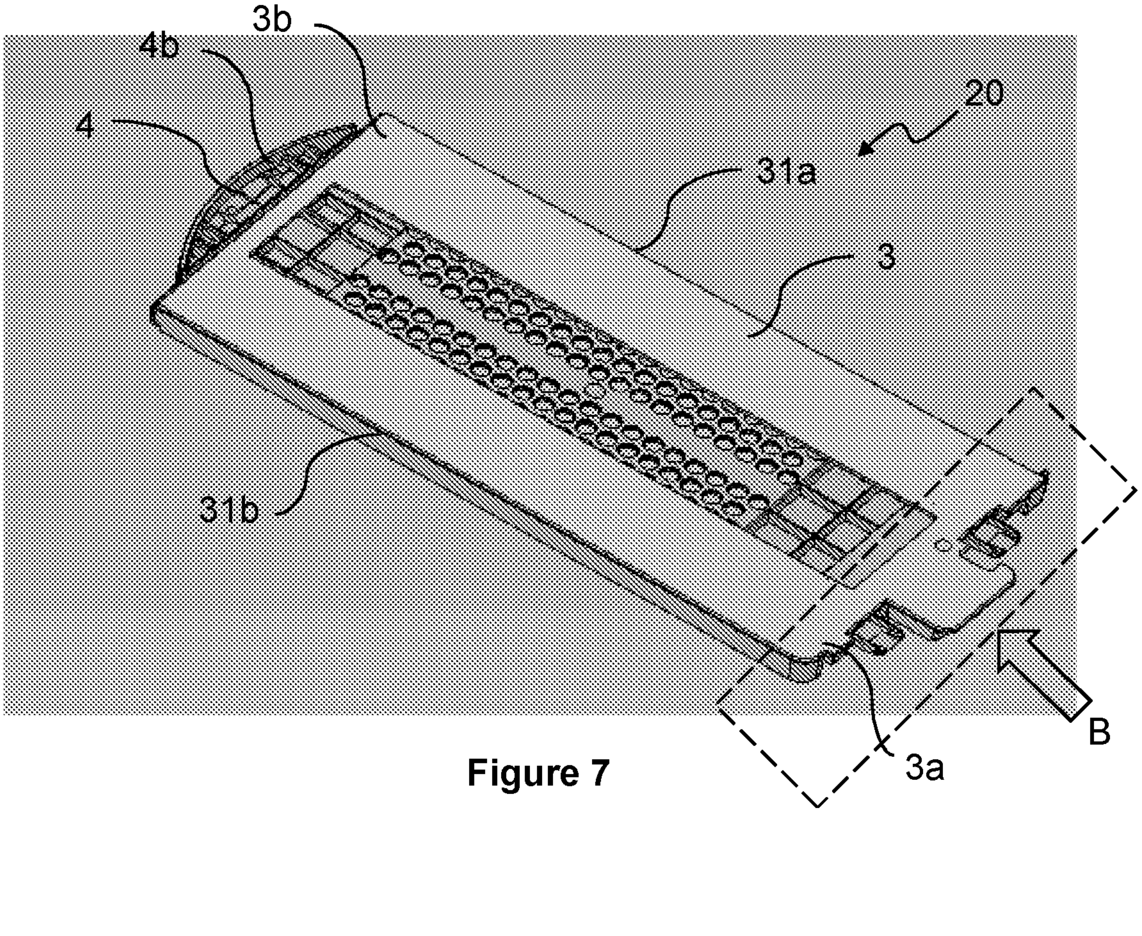
FIG. 7 is a reverse perspective view of the apparatus shown in FIG. 6.

The frame 3 shown in this embodiment is fabricated from rigid plastics material using a moulding technique. The area labelled “X” on the frame 3 in FIG. 6 (which describes the area between the channel 31*a* and the formation 42*b*) has a wall thickness of 1 mm, which is approximately 0.3 mm thicker than frames of the prior art.

The pouch 2 (shown in FIG. 1) is attached to the periphery of the frame 3 along the first end 3*a*, second end 3*b* and sides 3*c*, 3*d*, prior to use of the apparatus 1, to form the receptacle 10. The pouch 2 is ultrasonically welded to the periphery of the frame 3 along the first end 3*a*, second end 3*b* and sides 3*c*, 3*d*.

Figure 4:
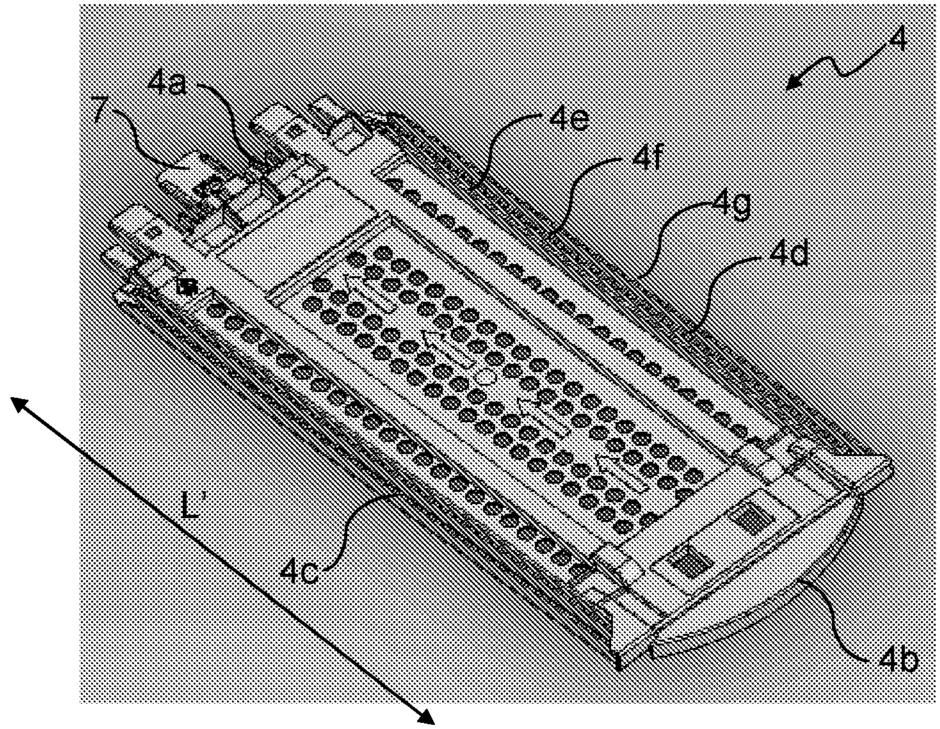
FIG. 4 is a perspective view of the cover plate of the apparatus shown in FIG. 1.
Figure 5:
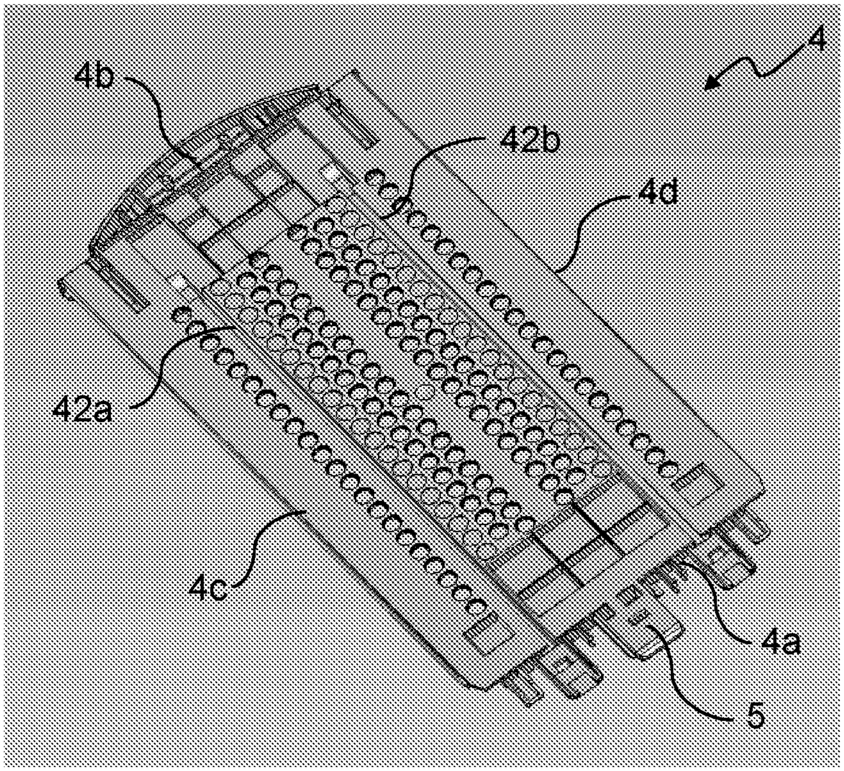
FIG. 5 is a reverse perspective view of the cover plate shown in FIG. 4.

Referring also to FIGS. 4 and 5, there is shown the cover plate 4 of the apparatus 1 of FIG. 1. The cover plate 4 comprises a leading end 4*a*, a trailing end 4*b*, and a pair of side edges 4*c*, 4*d*. The cover plate 4 comprises a longitudinal direction L', which extends in the major dimension of the cover plate 4 in this embodiment.

The cover plate 4 further comprises a pair of formations 42*a*, 42*b*. The formations 42*a*, 42*b* are elongate, in this embodiment. The formations 42*a*, 42*b* extend in the longitudinal direction L' of the cover plate 4, in this embodiment. In this embodiment, each of the formations 42*a*, 42*b* is an elongate recess that is shaped to cooperate with the protrusions of the frame, e.g. the L-shaped profile of the protrusion 32*a* or 32*b* respectively.

The leading end 4*a* of the cover plate 4 comprises a tongue 7, which is integrally formed with the cover plate 4. However, the tongue 7 may be attached to the cover plate 4 prior to use thereof.

The cover plate 4, which is generally planar, is provided absent openings which might be large enough to allow access therethrough to the contents of the receptacle 10 (when the cover plate 4 is attached thereto).

The side edges 4*c*, 4*d* of the cover plate 4 are configured to engage (for example, in a sliding manner) in the channels 31*a*, 31*b* in each of the sides 3*c*, 3*d* of the frame 3, when the cover plate 4 is inserted thereinto. Each peripheral edge 4*c* and 4*d* may comprise one or more, e.g. a plurality of, upstands 4*e*, 4*f*, 4*g* (as are clearly seen in FIG. 10), an inboard upstand 4*e* and an intermediate upstand 4*f* and an outboard upstand 4*g*.

The second end 3*b* of the frame 3 and the trailing end 4*b* of the cover plate 4 optionally each comprise a portion of a lock configured to irreversibly retain the cover plate 4 in the frame 3 when attached thereto.

Figure 8:
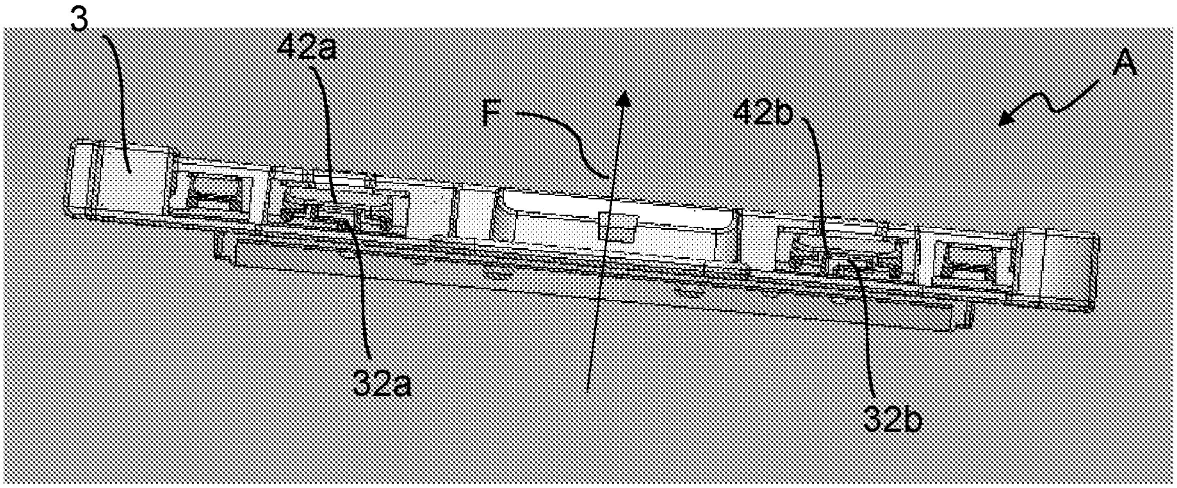
FIG. 8 is an end elevation of the apparatus shown in FIG. 6.
Figure 9:
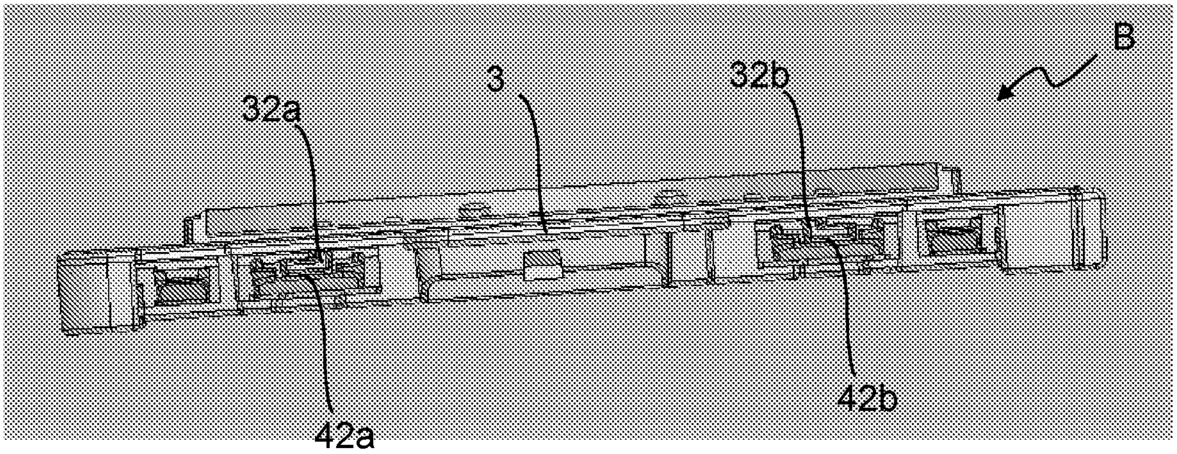
FIG. 9 is a reverse end elevation of the apparatus shown in FIG. 7.

Referring now to FIGS. 6 to 9, there is shown the frame 3 and the cover plate 4 in combination in a closed condition. FIG. 8 shows an end elevation of the frame 3 and cover plate 4 in a closed condition from the perspective labelled A, shown in FIG. 6. FIG. 9 shows a reverse side elevation of the frame 3 and cover plate 4 in a closed condition from the perspective labelled B, shown in FIG. 7.

When the cover plate 4 is in the closed position, formation 42*a* of the cover plate 4 is located remotely from the channel 31*a* of the frame 3. Similarly, the formation 42*b* of the cover plate 4 is located remotely from the channel 31*b* of the frame 3 when in the closed position. In this embodiment, each formation 42*a*, 42*b* of the cover plate 4 is located in between the channel 31*a*, 31*b* and the opening of the frame 3, in parallel relations to each channel 31*a*, 31*b* of the frame 3 when the cover plate 4 is positioned in a closed configuration. In this embodiment, the formations 42*a*, 42*b* extend endlessly and without interruption from the leading end 4*a* of the cover plate 4 to the trailing end 4*b* of the cover plate 4.

Figure 10:
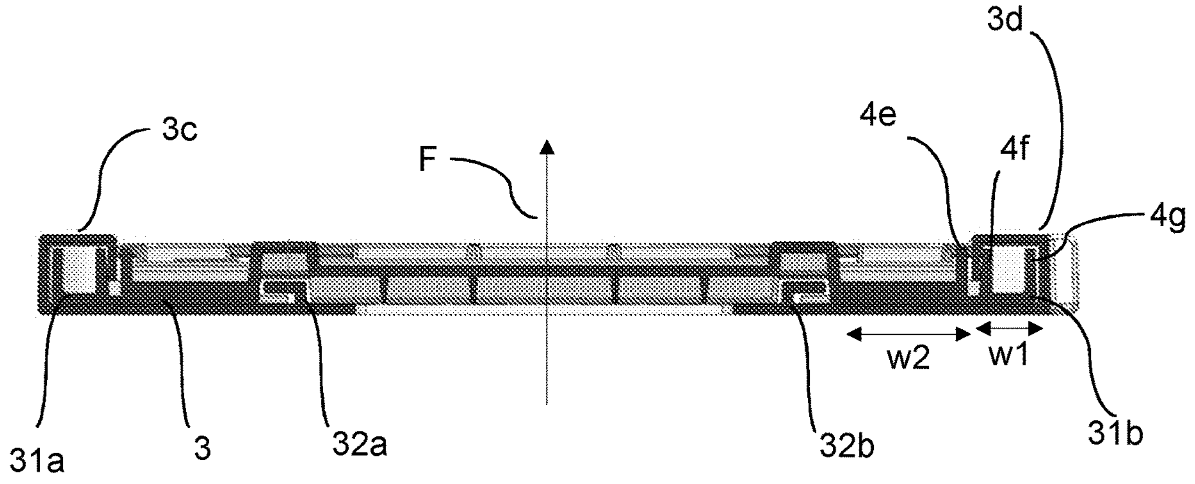
FIG. 10 is a schematic of the end elevation of the apparatus shown in FIG. 8.
Figure 10A:
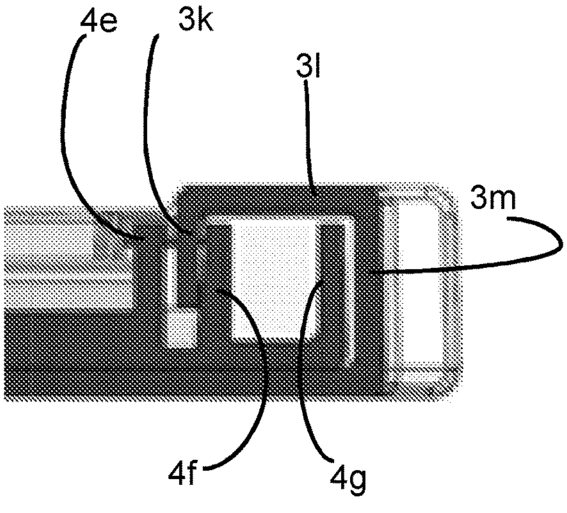
FIG. 10A is an enlarged view of a portion of the apparatus shown in FIG. 10.

Referring now to FIG. 10, there is shown a schematic of the side elevation of the apparatus shown in FIG. 8. The width of the channel 31*b* on the frame 3 is shown as w1. The spacing between the channel 31*b* and the interlocked formations 32*b*, 42*b* on the frame 3 and cover plate 4 respectively is shown as w2. Therefore, the interlocked formations 32*b*, 42*b* are spaced from the channel 31*b* by a distance (w2) which is greater than the outer width of the channel 31*b* (w1).

In this embodiment, the formations (elongate protrusions) 32*a*, 32*b* are formed integrally (e.g. are integrally moulded) with the frame 3. The formations (elongate recesses) 42*a*, 42*b* are also formed integrally with the cover plate 4, for example, during a moulding process. The formations (elongate protrusions) 32*a*, 32*b* and/or the formations (elongate recesses) 42*a*, 42*b* may also be formed from a resilient material such as a plastics material, e.g. a polymer such as polypropylene.

As described above, the cover plate 4 comprises plural laterally-spaced upstands 4*e*, 4*f*, 4*g* at either edge. One upstand 4*e* is inboard of the peripheral edge of the cover plate 4, on upstand 4*g* is located at the peripheral edge of the cover plate 4. A third upstand 4*f* is located between the inboard and outboard upstand 4*e*, 4*g*. The three upstands 4*e*, 4*f*, 4*g* extend in parallel to one another, substantially along the entirety or majority of the cover plate 4.

The frame 3 has a channel 31*a*, 31*b* at each edge thereof provided by outboard wall 3*m* which upstands from the base of the frame 3, overlying wall 31 which extends parallel to the base of the frame 3 and depending, inboard wall 3*k* which terminates above the base of the frame 3, thereby forming an Π-shaped enclosure. The Π-shaped enclosure receiving (e.g. slidably receiving) in use the outboard upstand 4*g* and intermediate upstand 4*f* of the cover plate, the outboard upstand 4*g* extending adjacent to outboard wall 3*m* and the intermediate upstand 4*f* extending adjacent the depending, inboard wall 3*k*. The inboard upstand 4*e* is located outside of the Π-shaped enclosure but adjacent the depending, inboard wall 3*k*, thereby inhibiting access to the terminal edge of the depending, inboard wall 3*k* to stop (or at least inhibit) attempts to pry the depending, inboard wall 3*k* upwards to allow removal of the cover plate 4 from the channel 31*a*, 31*b* (i.e. Π-shaped enclosure).

The apparatus 1 may optionally comprise a locking means or mechanism as described in FIGS. 1 to 7 (that is, the lock cover 5, the lock base 6, and the tongue 7 forming an interlocking tongue and groove mechanism). The locking means may be configured in use to irreversibly lock the cover plate 4 into a closed position on the frame 3 of the receptable (not shown).

The apparatus is suitable for securely retaining valuable documents such as bank notes.

Figure 11:
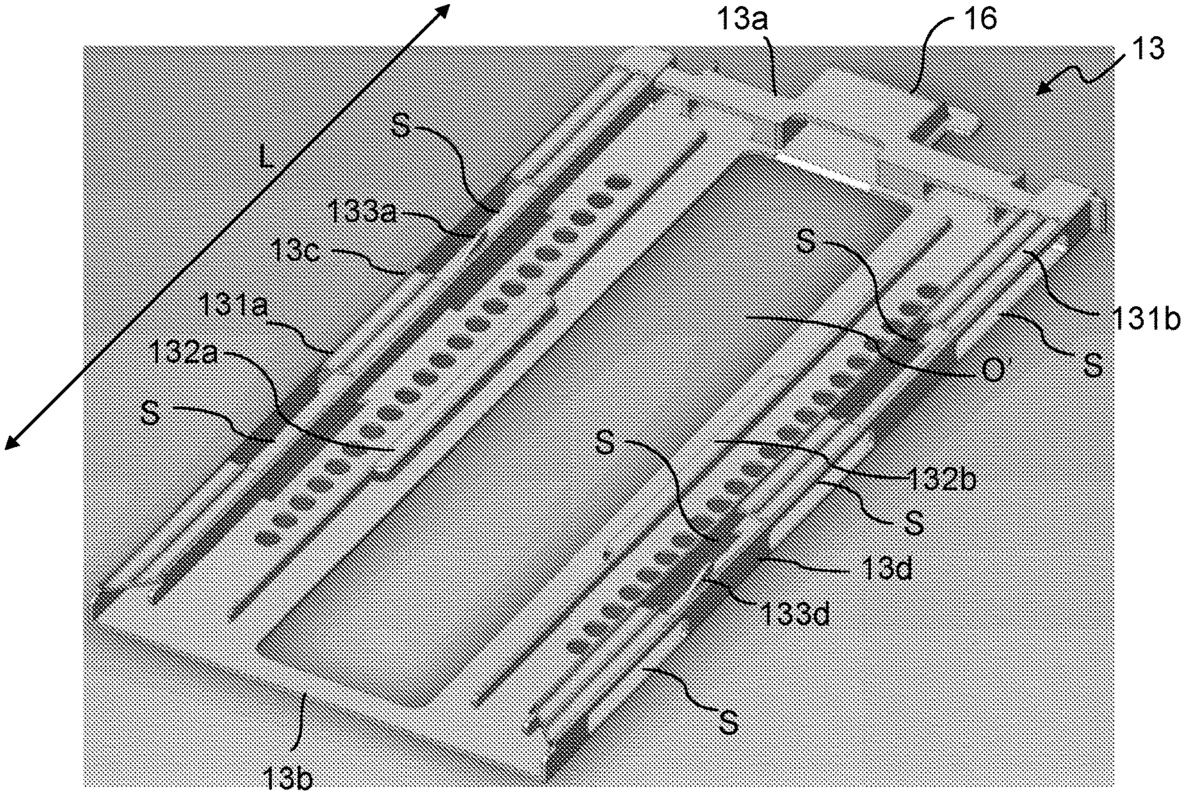
FIGS. 11 and 12 are perspective views of a frame according to a further embodiment of the invention.
Figure 12:
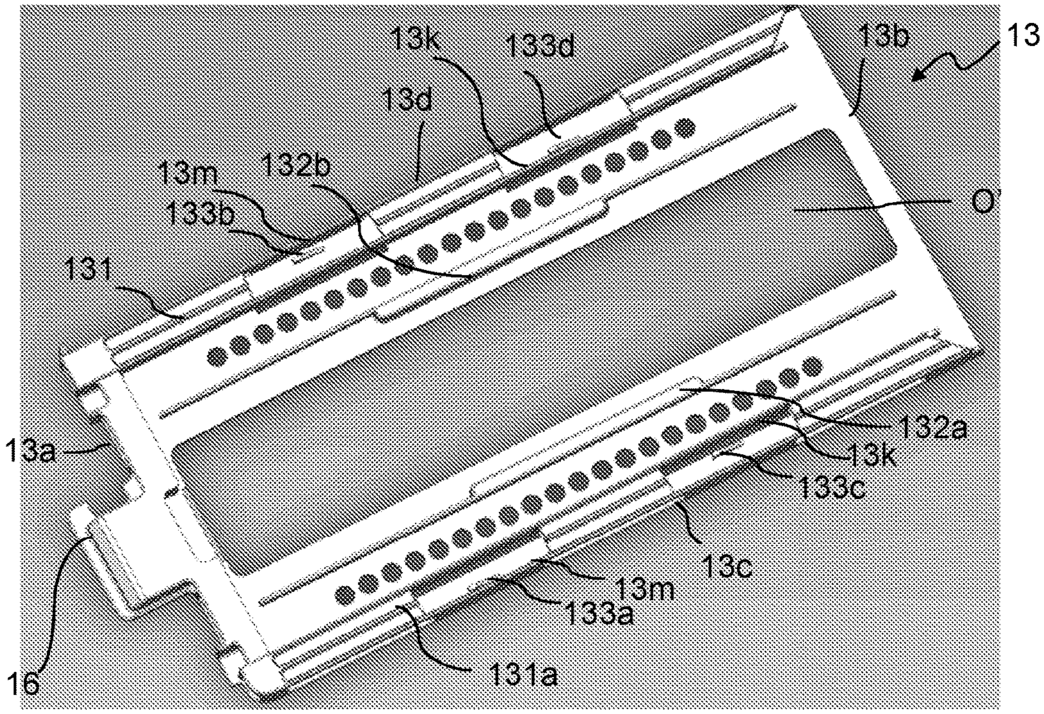

Referring now to FIGS. 11 and 12, there is shown a frame 13 of an apparatus according to a further embodiment of the invention. The frame 13 of FIGS. 11 and 12 differs from the frame 3 of FIGS. 1 to 3 and 6 to 10 but like features are depicted with like reference numerals with the additional prefix '1' and will not be described further herein.

In frame 13, each of the pair of formations 132*a*, 132*b* extends along the frame 13 in a longitudinal direction L, e.g. they extend longitudinally. The pair of formations 132*a*, 132*b* are each spaced from the first and second ends 13*a*, 13*b* of the frame 13. The pair of formations 132*a*, 132*b* are each spaced by an equal amount from both the first and second ends 13*a*, 13*b*. The first and second formations 132*a*, 132*b* each comprise an L-shaped portion. Each of the L-shaped portions extend across the central portion of the frame 13 equidistant between the first and second ends 13*a*, 13*b* of the frame 13. Each of the L-shaped portions extend across the central third of the frame 13, between the first and second ends 13*a*, 13*b* of the frame 13.

There are further provided locking formations 133 on the base of the frame 13 located within a channel 131 and inboard of the first and second ends 13*a*, 13*b*. Each locking formation is configured to engage and interlock a corresponding lock formation on a cover plate (not shown). In this embodiment each locking formation comprises a ramp clip 133. Each ramp clip 133 is configured to engage and interlock a corresponding ramp catch, on a cover plate (not shown).

In this embodiment there are provided four ramp clips 133*a* to 133*d*.

Ramp clips 133*a* and 133*c* are located on the base of the frame 13 within channel 131*a*.

Ramp clips 133*b* and 133*d* are located on the base of the frame 13 within channel 131*b*.

Ramp clips 133*a* and 133*d* are offset in a longitudinal direction with respect to one another.

Ramp clips 133*b* and 133*c* are offset in a longitudinal direction with respect to one another.

Each ramp clip 133 is located within a single channel of the frame 13. Ramp clips 133*a*, 133*b* are located towards the outboard wall 13*m* of their respective channels 131*a*, 131*b*.

Ramp clips 133*c*, 133*d* are located towards the inboard wall 13*k* of their respective channels 131*a*, 131*b*.

Each ramp clip 133 is offset (e.g. in a direction extending between the first and second end of the frame) from the others or from each other ramp clip 133 in the channel. Ramp clip 133*a* is laterally offset from ramp clip 133*c* and ramp clip 133*b* is laterally offset from ramp clip 133*d*. In this way, when the cover plate is slidably received and engaged by the frame 13, the or each ramp clip on the frame only engages with the corresponding ramp catch on the cover plate. Accordingly, the cover plate may be received by the frame 13 (e.g. slid thereinto) until the leading end of the cover plate is adjacent the first end of the frame 13*a*. In this way, the cover plate may be removed from the frame 13 (e.g. slid therefrom) at any time until the leading end of the cover plate is adjacent the first end of the frame 13*a*.

Where the apparatus, comprises a further locking means or mechanism, the apparatus, may comprise one or more structural apertures. In this embodiment, the frame 13 comprising locking formations 133, additionally comprises structural apertures S. The structural apertures S are provided in the one or more walls of the channels 131*a*, 131*b* of the frame 13, i.e. in the side walls and joining walls (the walls joining the side walls) of the channels 131*a*, 131*b*.

Advantageously, provision of structural apertures S adjacent a locking means or mechanism enables the frame 13 to be manufacture at relatively reduced expense. For example, provision of the structural apertures S may allow the frame to be manufactured as one piece (e.g. in a single, integral piece), for example via moulding. Absent the structural apertures S it may not be possible to form the frame in one piece. By forming the frame 13 in one piece the costs of manufacture may be relatively reduced (with subsequent reduction in overall expense of the apparatus).

Figure 13:
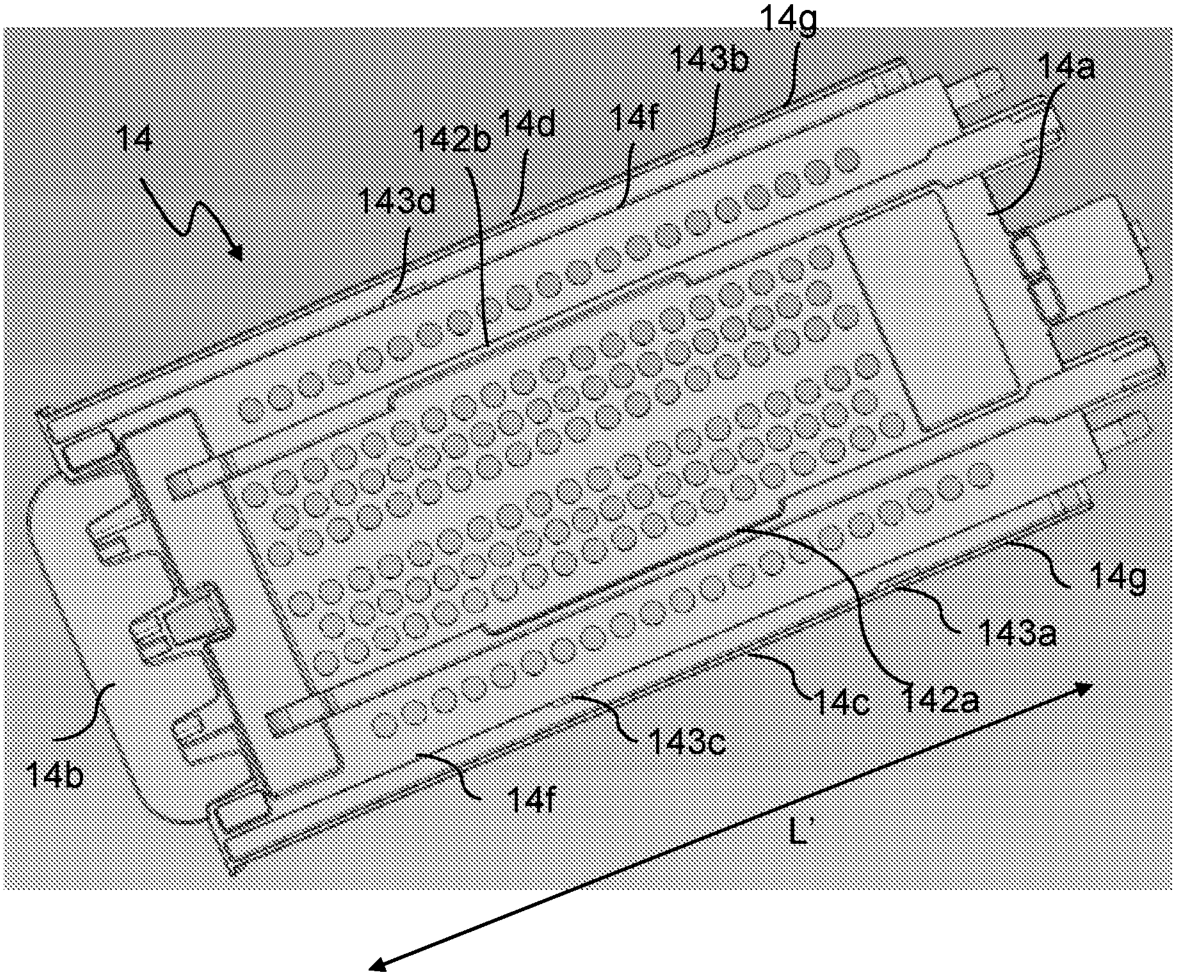
FIG. 13 is a perspective view of a cover plate according to a further embodiment of the invention.

The cover plate 14 of FIG. 13 differs from the cover plate 4 of FIGS. 1 and 4 to 10 but like features are depicted with like reference numerals with the additional prefix 1 and will not be described further herein.

In this embodiment, the cover plate 14 further comprises a pair of formations 142*a*, 142*b*. Each of the formations 142*a*, 142*b* is an elongate recess shaped to cooperate with protrusions on a frame (not shown). Each of the formations 142*a*, 142*b* extends along the cover plate 14 in a longitudinal direction L', e.g. longitudinally. Each of the pair of formations 142*a*, 142*b* extends along the cover plate 14, spaced from the leading and trailing ends 14*a*, 14*b*. The pair of formations 142*a*, 142*b* are each spaced by an equal amount from the leading and trailing ends 14*a*, 14*b*, in this embodiment. The first and second formations 142*a*, 142*b* each comprise a recess. The first and second formations 142*a*, 142*b* each comprise a projection. The projection of each formation 142*a*, 142*b* extends above the recess. The projection of each formation 142*a*, 142*b* extends in a direction substantially parallel to the or a major surface of the cover plate 14. The projection of each formation 142*a*, 142*b* is elongate. The projection of each formation 142*a*, 142*b* is longitudinally elongate, e.g. extends in the longitudinal direction L' of the cover plate 14. The projection of each formation 142*a* 142*b* is configured and/or arranged to engage or interlock with at least a portion of the formations 132*a*, 132*b* of the frame 13, in use. The projection of each formation 142*a*, 142*b* extends along the cover plate 14 spaced from the leading and trailing ends 14*a*, 14*b* thereof. The projection of each formation 142*a*, 142*b* extends along the central portion of the cover plate 14. In this embodiment, the projection of each formation 142*a*, 142*b* extends across approximately a third of the length of the cover plate 14.

There are further provided lock formations 143 on the base of the cover plate 14. The lock formations 143 are located inboard of the leading and trailing ends 14*a*, 14*b*. Each lock formation is configured to engage and interlock a corresponding locking formation on a frame (not shown). In this embodiment each lock formation comprises a ramp catch 143. Each ramp catch 143 is configured to engage and interlock a corresponding ramp clip, on a frame (not shown).

In this embodiment there are provided four ramp catches 143*a* to 143*d*.

Each peripheral edge 14*c* and 14*d* may comprise one or more, e.g. a plurality of, upstands. In this embodiment, ramp catches 143*a* and 143*c* are located between a first and second upstand 14*g*, 14*f* (e.g. an outboard and intermediate upstand) on the side of the cover plate 14*c*. Ramp catches 143*b* and 143*d* are located between a first and second upstand 14*g*, 14*f* (e.g. an outboard and intermediate upstand) on the side of the cover plate 14*d*.

Ramp catches 143*a* and 143*d* are orientated diagonally with respect to one another. Ramp catches 143*b* and 143*c* are orientated diagonally with respect to one another.

Each ramp catch 143 is offset (e.g. in a direction extending between the leading and trailing end of the cover plate) from the others or from each other ramp catch 143 on the same side of the cover plate 14. Ramp catch 143*a* is offset from ramp catch 143*c* and ramp catch 143*b* is offset from ramp catch 143*d*. Ramp catches 143*a*, 143*b* are located on or adjacent outboard upstand 4*g*. Ramp catches 143*c*, 143*d* are located on or adjacent intermediate upstand 4*f*. In this way, when the cover plate 14 is slidably received and engaged by a frame, the or each ramp catch 143 on the cover plate 14 only engages with the corresponding ramp clip on the frame. Accordingly, the cover plate 14 may be received by a frame (e.g. slid thereinto) until the leading end of the cover plate 14*a* is adjacent the first end of the frame. In this way, the cover plate 14 may be removed from the frame (e.g. slid therefrom) at any time until the leading end of the cover plate 14*a* is adjacent the first end of the frame.

Figure 14A:
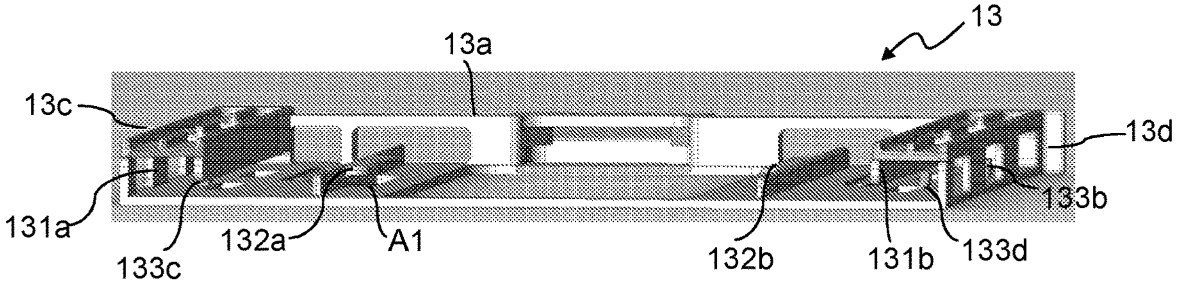
FIG. 14A is a schematic view of a cross-section of the frame shown in FIG. 11.
Figure 14B:
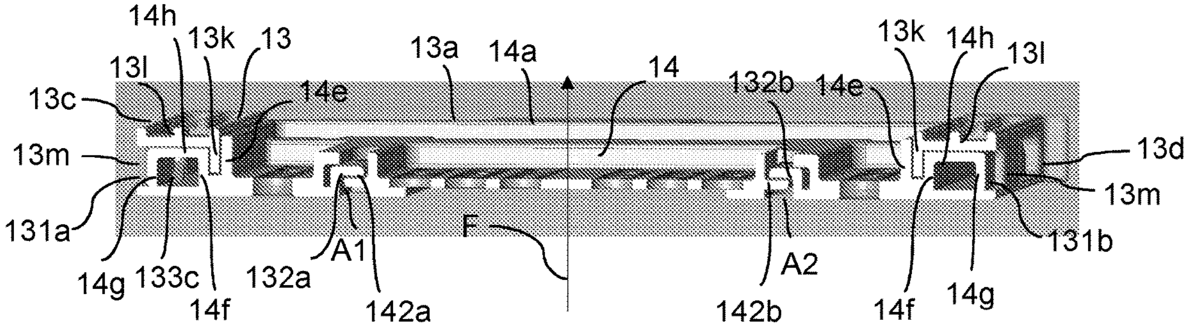
FIG. 14B is a schematic view of a cross-section of the frame shown in FIG. 11 engaged with the cover plate shown in FIG. 13.

FIG. 14A shows a schematic of the side elevation of the frame 13 shown in FIGS. 11 and FIG. 14B shows a cross-sectional view of the frame 13 shown in FIG. 11 engaged with the cover plate 14 shown in FIG. 13, i.e. in a closed condition or position.

The formations 132*a*, 132*b* are elongate protrusions 132*a*, 132*b* having an L-shaped profile when viewed in side elevation. The free end of each protrusion faces towards the opening O'.

Each of the pair of formations 142*a*, 142*b* comprise an elongate recess with a projection thereover, shaped and positioned to cooperate with the protrusions 132*a*, 132*b* of the frame 13, e.g. the L-shaped profile of the protrusion 132*a* or 132*b*, respectively.

When the cover plate 14 is in the closed position, formation 142*a* of the cover plate 14 is located remotely from the channel 131*a* of the frame 13. Similarly, the formation 142*b* of the cover plate 14 is located remotely from the channel 131*b* of the frame 13 when the cover plate 14 is in the closed position in or on the frame 13. In this embodiment, each formation 142*a*, 142*b* of the cover plate 14 is located in between the channel 131*a*, 131*b* and the opening of the frame 13, in parallel relations to each channel 131*a*, 131*b* of the frame 13 when the cover plate 14 is positioned in a closed configuration. In this embodiment, the formations 142*a*, 142*b* extend across a portion, the central third, of the cover plate 14, remote from and equidistant between the leading and trailing ends 14*a*, 14*b*. The sides 13*c*, 13*d* of the frame 13 each comprise a channel (or slot) 131*a*, 131*b* for receipt of side edges of the cover plate 14. The channels 131*a*, 131*b* may be of a Π-shaped form, each having substantially parallel innermost and outermost walls 13*k* and 13*m* respectively, joined by a joining wall 13*l*. The innermost wall 13*k* of each channel 131*a*, 131*b* has a free end to allow the cover plate 14 to be received in the channels 131*a*, 131*b*.

The side edges 14*c*, 14*d* of the cover plate 4 are configured to engage (for example, in a sliding manner) in the channels 131*a*, 131*b* in each of the sides 13*c*, 13*d* of the frame 13, when the cover plate 14 is inserted thereinto. Each peripheral edge 14*c* and 14*d* may comprise one or more, e.g. a plurality of, upstands 14*e*, 14*f*, 14*g*. In this embodiment, there is provided an inboard upstand 14*e*, an intermediate upstand 14*f* and an outboard upstand 14*g*. The outboard upstand 14*g* and the intermediate upstand 14*f* joined by a joining wall 14*h*.

In this embodiment, ramp catches 143*a*, 143*b* are located on or adjacent outboard upstand 4*g* and ramp catches 143*c*, 143*d* are located on or adjacent intermediate upstand 4*f*.

In this embodiment, the formations (L-shaped elongate protrusions) 132*a*, 132*b* are formed integrally (e.g. are integrally moulded) with the frame 13. The formations 142*a*, 142*b* are also formed integrally with the cover plate 14, for example, during a moulding process. The formations (L-shaped elongate protrusions) 132*a*, 132*b* and/or the formations 142*a*, 142*b* may also be formed from a resilient material such as a plastics material, e.g. a polymer such as polypropylene.

Forming apertures A1, A2 are located directly beneath the corresponding formations 132*a*, 132*b*. In this embodiment the forming apertures A1, A2 are parallel to the formations 132*a*, 132*b* and extend along the length of the frame at a distance equal to the formations 132*a*, 132*b*.

Advantageously, provision of a forming aperture A1 beneath formation 132*a* and a forming aperture A2 beneath formation 132*b* enables the frame to be manufactured at relatively reduced expense. For example, provision of the forming apertures A1, A2 allows the frame to manufactured as one piece (e.g. in a single, integral piece), for example via moulding. Absent the forming apertures A1, A2 it may not be possible to form the frame in one piece. By forming the frame in one piece the costs of manufacture are relatively reduced (with subsequent reduction in overall expense of the apparatus). It has been surprisingly found that formations 132*a* and 132*b* which extend less than the entire distance from the first to second end of the frame provide acceptable resistance to removal of the cover plate from the frame (when engaged therewith). Furthermore, by limiting the extent by which the forming apertures A1, A2 extend along the frame (e.g. between the first and second end thereof) it has been surprisingly found that the structural integrity of the frame is not compromised. The inventive solution provides for: a relatively cheaper apparatus (compared with the prior art); enhanced resistance to removal of the cover plate from the frame (when engaged therewith) in a direction perpendicular to a plane parallel to a major surface of the cover plate or frame; and retains suitable structural integrity.

In use, and with the frame 3, 13 retained in a document receiving device, such as the applicant's CCi device, bank notes or other documents are inserted through the opening O, O' in the frame 3, 13 and are retained within the pouch 2. When the pouch 2 is full or it is determined that the receptacle 10 (comprising the frame 3, 13 and pouch 2) should otherwise be closed (for example to allow for secure transport of the bank notes) the cover plate 4, 14 is secured to the frame 3, 13 of the receptacle 10. The sides 4*c*, 4*d*, 14*c*, 14*d* of the cover plate 4, 14 are slidably received into the slots or channels in the sides 3*c*, 3*d*, 13*c*, 13*d* of the frame 3, 13 until the leading end 4*a*, 14*a* of the cover plate 4, 14 is adjacent the first end 3*a*, 13*a* of the frame 3, 13. The formations (the elongate protrusions) 32*a*, 32*b*,132*a*, 132*b* located on the frame 3, 13 are slidably received within the formations (the elongate recesses) 42*a*, 42*b*, 142*a*, 142*b* located in the cover plate 4, 14 respectively. In this condition the tongue 7 of the frame 3, 13 is aligned with the groove defined by the lock cover 5 and lock base 6. Further sliding of the cover plate 4, 14 into the frame 3, 13 causes the tongue 7 to be inserted into the groove, and hence between the lock cover 5 and the lock base 6. In the closed position, the cover plate 4, 14 covers the opening of the frame and prevents access to the interior of the pouch of the receptacle (not shown). The trailing end 4*b*, 14*b* of the cover plate 4, 14 may form a lock with the second end 3*b*, 13*b* of the frame 3, 13 using mutually engaging portions of each respective part.

As will be appreciated, the peripheral edges of the cover plate 4, 14 are received within the channels 31*a*, 31*b*, 131*a*, 131*b* of the frame 3, 13 and access to the peripheral edges of the cover plate 4, 14 is prevented by the overlying wall 31, 31 of the channel 31*a*, 31*b*, 131*a*, 131*b*.

If the optional plural ramp clips 133 are present, sliding of the cover plate 14 into the frame 13 causes each the ramp clips 133 on the frame 13 to simultaneously interlock with the corresponding ramp catches 143 provided on the cover plate 14.

If the optional plural upstands (4*e* to 4*g*, 14*e* to 14*g*) are present, the outboard and intermediate upstand 4*f*, 4*g*, 14*f*, 14*g* will be located within the Π-shaped channels 31*a*, 31*b*, 131*a*, 131*b* i.e. between inboard wall 3*k*, 13*k* and outboard wall 3*m*, 13*m* of the channel 31*a*, 13*b*, 131*a*, 131*b* whereas the inboard wall 3*k*, 13*k* of the channel 31*a*, 131*a* is housed between the inboard upstand 4*e*, 14*e* and the intermediate upstand 4*f*, 14*f*, thereby further restricting or inhibiting access to the edge of the cover plate 4, 14. By having the outboard upstand 4*g*, 14*g* adjacent the outboard wall 3*m*, 13*m* of the channel 31*a*, 31*b*, 131*a*, 131*b* and the intermediate upstand 4*f*, 14*f* adjacent the inboard wall 3*k*, 13*k* of the channel 31*a*, 31*b*, 131*a*, 131*b* the adjacent walls are mutually supportive in the event of an attempt to prise the cover plate 4, 14 from the frame 3, 13.

Advantageously, the formations 32*a*, 32*b*, 132*a*, 132*b* of the frame 3, 13 are shaped to interlock with the respective formations 42*a*, 42*b*, 142*a*, 142*b* of the cover plate 4, 14, and are configured in use to resist, and for example prevent, removal of the cover plate 4, 14 in a direction transverse and/or perpendicular to the major surface of the cover plate 4, 14, as illustrated by the arrow labelled F in FIGS. 8, 10 and 14B. Engagement of the formations (elongate protrusions) 32*a*, 32*b*, 132*a*, 132*b* on the frame 3, 13 of the receptacle with the formations (recesses) 42*a*, 42*b*, 142*a*, 142*b* on the cover plate 4, 14 serves to prevent or further restrict removal of the cover plate 4, 14 from the receptacle when in a closed condition.

Without wishing to be bound by any particular theory, it is believed that locating the interlocking first formation 32*a*, 32*b*, 132*a*, 132*b* in parallel relations to, but spaced from, the channels 31*a*, 31*b*, 131*a*, 131*b* of the frame 3, 13, toward the centre of the frame 3, 13, means that in order to bias the channels 31*a*, 31*b*, 131*a*, 131*b* of the frame 3, 13 out of engagement with the side edges 4*c*, 4*d*, 14*c*, 14*d* of the cover plate 4, 14, a relatively greater force is required. Were a user to push or pull or otherwise displace the major surface of the cover plate 4, 14 away from the major surface of the frame 3, 13 in an attempt to disengage the cover plate 4, 14 from the channels 31*a*, 31*b*, 131*a*, 131*b* in the frame 3, 13 of the receptacle, the interlocking first and second formations 32*a*, 42*a*, 132*a*, 142*a* and 32*b*, 42*b*, 132*b*, 142*b* would become more firmly and securely engaged, thereby preventing or restricting disengagement of the cover plate 4, 14 from the channels 31*a*, 31*b*, 131*a*, 131*b* of the frame 3, 13.

If an attempt to remove the cover plate 3, 13 is made in a direction transverse and/or perpendicular to the major surface of the cover plate 3, 13, then the first formations 32*a*, 32*b*, 132*a*, 132*b* (L-shaped protrusion) will be forced inwardly and towards each other, which increases their engagement within their respective second formations 42*a*, 42*b*, 142*a*, 142*b* (recesses).

Advantageously, location of the formations (elongate protrusions) 32*a*, 32*b*, 132*a*, 132*b* on the frame 3, 13 and corresponding formations (elongate recesses) 42*a*, 42*b*, 142*a*, 142*b* on the cover plate 4, 14 provide a tamper-evident means, which is remote from the channels 31*a*, 31*b*, 131*a*, 131*b* and does not interfere or interact with the mechanism of securing the sides 4*c*, 4*d*, 14*c*, 14*d* of the cover plate 4, 14 within the channels 31*a*, 31*b*, 131*a*, 131*b* of the frame 3, 13. This is advantageous because the apparatus 1 therefore comprises an additional, independent, and separate interlocking means to the channels 31*a*, 31*b*, 131*a*, 131*b* to prevent the cover plate 4, 14 from being removed. It is believed that these additional interlocking means make it more difficult to flex the cover plate 4, 14, especially if it is fabricated from a resilient material, to disengage the sides 4*c*, 4*d*, 14*c*, 14*d* of the cover plate 4, 14 from the channels 31*a*, 31*b*, 131*a*, 131*b*.

Accordingly, were an attempt made to displace the channels 31*a*, 31*b*, 131*a*, 131*b* of the frame 3, 13 into a position to disengage the cover plate 4, 14, there is a relatively reduced likelihood that such an attempt would be successful. Furthermore, the formations 32*a*, 32*b*, 132*a*, 132*b* on the frame 3, 13 would be relatively more likely to be damaged or broken were such an attempt made, due to the relatively greater forces to which the formations (elongate protrusions) 32*a*, 32*b*, 132*a*, 132*b* would need to be subjected to remove it from the recess. Additionally, if the cover plate 4, 14 is subjected to high stress then the formations (elongate protrusions) 32*a*, 32*b*, 132*a*, 132*b* of the frame 3, 13 may break or snap to provide evidence that the apparatus 1 has been tampered with.

It will be appreciated by those skilled in the art that several variations to the aforementioned embodiments are envisaged without departing from the scope of the invention. For example, the elongate protrusion need not have an L-shaped profile. The elongate protrusion may have a T-shaped profile, or any other shape that enables the tamper resistant means to perform its function.

For example, although the in-board formation is described above to be elongate it may form part of an array (two or more) of aligned formations which together provided an appropriate elongate in-board securement. For example a succession of relative short but spaced and aligned formations may act to provide a quasi-continuous formation. The corresponding formation may be continuous or it too may be formed from an array (two or more) complementary formations. Accordingly, one of the formations may be continuous and its complementary formation formed from discrete formations in an array, or both formations may be formed of discrete formations or both may be formed from continuous formations.

It will also be appreciated by those skilled in the art that any number of combinations of the aforementioned features and/or those shown in the appended drawings provide clear advantages over the prior art and are therefore within the scope of the invention described herein.

The invention claimed is:

1. An apparatus for securely retaining documents, the apparatus comprising a cover plate and a receptacle, the receptacle comprising a frame and a pouch, the frame comprising an opening to access the pouch, the frame further comprising at least one channel for receiving an edge of the cover plate in use to cover the opening of the frame and to prevent access to the interior of the pouch of the receptacle when the cover plate is in a closed position, wherein the frame and the cover plate each comprise engageable lock portions to prevent the cover plate from being removed from the receptacle when in the closed position, and wherein the frame comprises a first formation located remotely from the at least one channel and located between the at least one channel and the opening, the cover plate comprises a second formation located remotely from the edge of the cover plate, the first and second formations being shaped to interlock to resist removal of the cover plate in a direction transverse and/or perpendicular to the major surface of the cover plate.

2. An apparatus according to claim 1, wherein one of the first formation and the second formation comprise a protrusion and the other of the second formation and the first formation comprise a recess.

3. An apparatus according to claim 2, wherein the protrusion has a first portion and a second portion extending from the first portion and wherein the second portion extends at an angle to the first portion.

4. An apparatus according to claim 3, wherein the protrusion has an L-shaped or a T-shaped profile, and the recess is shaped to cooperate with the L-shaped or a T-shaped profile.

5. An apparatus according to claim 1, wherein the first formation is slidably received within the second formation or vice versa, in use.

6. An apparatus according to claim 1, wherein at least a portion of the first formation and/or the second formation extends in parallel to at least a portion of the at least one channel.

7. An apparatus according to claim 1, wherein the frame comprises a longitudinal direction and the first formation extends in the longitudinal direction of the frame and wherein the cover plate comprises a longitudinal direction and the second formation extends in the longitudinal direction of the cover plate.

8. An apparatus according to claim 1, wherein the frame of the receptacle comprises a first end and a second end, and wherein the first formation extends between the first and second ends.

9. An apparatus according to claim 1, wherein the frame comprises a first end and a second end and a length extending between the first and second ends, and wherein the first formation extends along less than 90%, 80%, 70%, 60%, 50% or 40% of the length of the frame.

10. An apparatus according to claim 1, wherein cover plate comprises a leading end and a trailing end, and wherein the second formation extends in a direction between the leading end and the trailing end.

11. An apparatus according to claim 1, wherein the cover plate comprises a leading end and a trailing end and a length between the leading end and trailing end, and wherein the second formation extends along less than 90%, 80%, 70%, 60%, 50% or 40% of the length of the cover plate.

12. An apparatus according to claim 1, wherein said at least one channel comprises a first channel and a second channel and wherein the first channel and the second channel are located at respective side edges of the frame.

13. An apparatus according to claim 1, wherein the frame comprises a third formation located remotely from the at least one channel, the cover plate comprises a fourth formation located remotely from the at least one channel of the frame and wherein the third formation and fourth formation are shaped to interlock in use and are configured in use to resist removal of the cover plate in a direction transverse and/or perpendicular to the major surface of the cover plate.

14. An apparatus according to claim 1, wherein the cover plate comprises one or more upstands located at or proximate the edge of the cover plate.

15. An apparatus according to claim 14, wherein the channel comprises an inboard wall and said inboard wall is, in use, located adjacent an upstand.

16. An apparatus according to claim 1, wherein the at least one channel comprises a base portion and a wall upstanding therefrom and wherein the upstanding wall is continuous or discontinuous and the at least one channel comprises a roof portion extending from the upstanding wall towards the opening and wherein the roof portion is continuous or discontinuous.

17. An apparatus according to claim 1, wherein the at least one channel comprises a base portion and at least one ramp formation extending from the base portion.

18. An apparatus according to claim 17, wherein each channel comprises a plurality of said at least one ramp formations and wherein the plurality of said at least one ramp formations are laterally and/or longitudinally displaced with respect to one another.

19. An apparatus according to claim 17, wherein the cover plate comprises at least one depending ramp formation engageable with said at least one formation, in use.

20. An apparatus according to claim 1, wherein said engageable lock portions comprise a first lock portion on the frame and a second lock portion on the cover plate and wherein the second lock portion is at a leading edge of the cover plate.

* * * * *